(12) United States Patent
Yu et al.

(10) Patent No.: US 11,495,936 B2
(45) Date of Patent: Nov. 8, 2022

(54) OPTICAL AMPLIFIER ASSEMBLY AND DETECTION METHOD FOR DYNAMICALLY EXECUTABLE OPTICAL TIME-DOMAIN REFLECTION DETECTION

(71) Applicant: Accelink Technologies Co., Ltd., Wuhan (CN)

(72) Inventors: Zhenyu Yu, Wuhan (CN); Qinlian Bu, Wuhan (CN); Chengpeng Fu, Wuhan (CN); Zhijun Ye, Wuhan (CN); Fei Liu, Wuhan (CN); Fuxing Deng, Wuhan (CN); Rui Lei, Wuhan (CN); Xiao Cai, Wuhan (CN)

(73) Assignee: Accelink Technologies Co., Ltd.

( * ) Notice: Subject to any disclaimer, the term of this patent is extended or adjusted under 35 U.S.C. 154(b) by 494 days.

(21) Appl. No.: 16/624,656

(22) PCT Filed: Dec. 25, 2017

(86) PCT No.: PCT/CN2017/118188
§ 371 (c)(1),
(2) Date: Feb. 3, 2020

(87) PCT Pub. No.: WO2019/000876
PCT Pub. Date: Jan. 3, 2019

(65) Prior Publication Data
US 2020/0220316 A1 Jul. 9, 2020

(30) Foreign Application Priority Data
Jun. 28, 2017 (CN) .......................... 201710508167.2

(51) Int. Cl.
*H04B 10/071* (2013.01)
*H01S 3/094* (2006.01)
*H01S 3/067* (2006.01)

(52) U.S. Cl.
CPC ...... *H01S 3/094046* (2013.01); *H01S 3/0677* (2013.01); *H01S 3/06766* (2013.01); *H04B 10/071* (2013.01)

(58) Field of Classification Search
CPC .............. H01S 3/06766; H01S 3/0677; H01S 3/094046; H04B 10/071
See application file for complete search history.

(56) References Cited

U.S. PATENT DOCUMENTS

2006/0204244 A1 9/2006 Fella et al.
2015/0381274 A1 12/2015 Archambault et al.

FOREIGN PATENT DOCUMENTS

CN 1711707 A 12/2005
CN 103701522 * 4/2014
(Continued)

OTHER PUBLICATIONS

International Search Report for PCT/CN2017/118188 dated Apr. 8, 2018.

*Primary Examiner* — Michael Carter
(74) *Attorney, Agent, or Firm* — Lerner, David, Littenberg, Krumholz & Mentlik, LLP

(57) ABSTRACT

An optical amplifier assembly and a detection method capable of dynamically performing optical time-domain reflection detection. The detection method comprises obtaining signal light intensity detection signals from a first and second photodetectors and sending a control signal to an L-band Raman pump when the signal light intensity in the second photodetector is lower than a first preset threshold, so that the L-band Raman pump enters into an optical time-domain reflection detection mode; sending a control signal to the L-band Raman pump when the signal light intensity in the second photodetector is greater than or equal the first (Continued)

preset threshold, so that the L-band Raman pump enters into an L-Band Raman optical fiber amplifier operation mode.

20 Claims, 5 Drawing Sheets

(56) References Cited

FOREIGN PATENT DOCUMENTS

| CN | 103701522 A | 4/2014 |
|---|---|---|
| CN | 203859384 U | 10/2014 |
| CN | 107332101 A | 11/2017 |

* cited by examiner

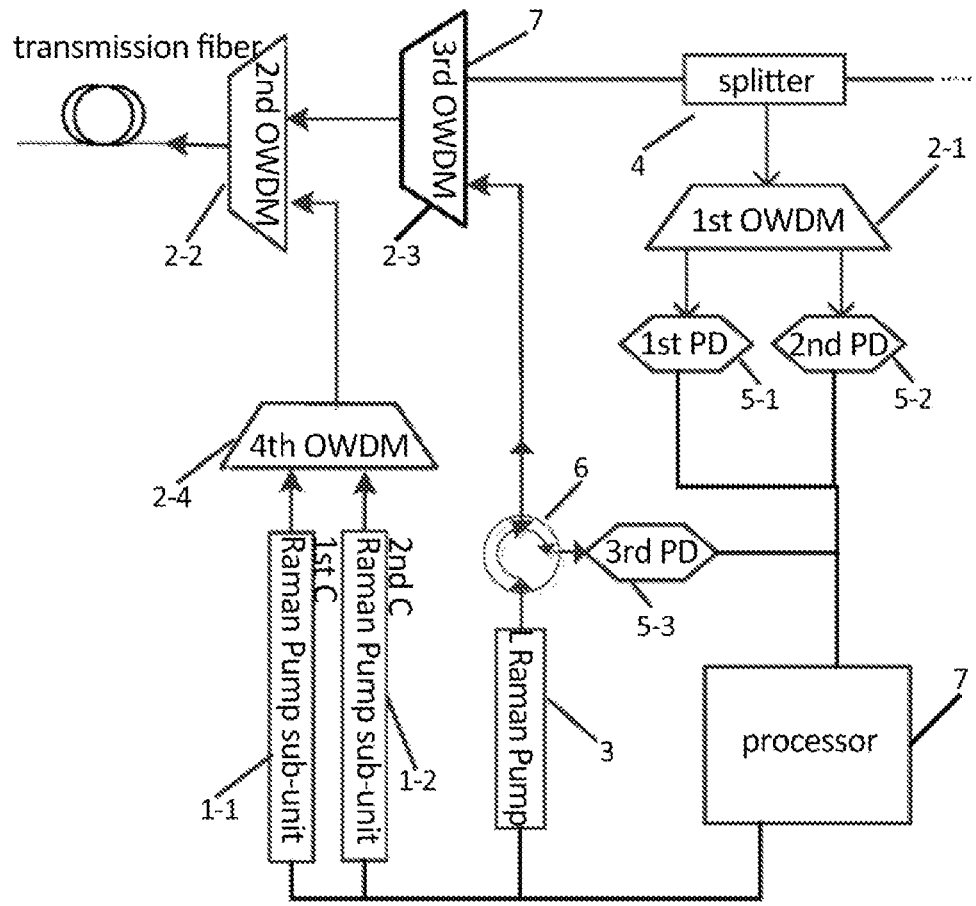

FIG. 7 obtaining signal light intensity detection signals from first and second photodetectors and sending a control signal to the L-band Raman pump when the signal light intensity in the second photodetector is lower than the first preset threshold so that the L-band Raman pump enters into the optical time-domain reflection detection mode — 201 sending a control signal to the L-band Raman pump when the signal light intensity in the second photodetector is greater than or equal to the first preset threshold so that the L-band Raman pump enters into the L-band Raman optical fiber amplifier operating mode — 202

FIG. 8

OPTICAL AMPLIFIER ASSEMBLY AND DETECTION METHOD FOR DYNAMICALLY EXECUTABLE OPTICAL TIME-DOMAIN REFLECTION DETECTION

TECHNICAL FIELD OF THE DISCLOSURE

The present disclosure relates to the field of optical amplifier technology, and in particular, to an optical amplifier assembly and a detection method capable of dynamically performing optical time-domain reflection detection.

BACKGROUND

As optical fiber communication continuously advances towards larger capacity and higher speed, the topology of optical fiber transmission network becomes more and more complicated. During installation, commissioning, maintenance, upgrade, overhaul and especially troubleshooting of a complex system, it may need to analyze characteristics of a physical medium in the optical transmission network, determine nature and location of a fault point in the transmission cables, and make appropriate remedies and maintenances quickly.

An optical time-domain reflectometer includes, as core parts, a laser and a photodetector. The laser emits, after pulse modulation, detection light with a certain power, a certain pulse width, a certain frequency and a certain wavelength, which is coupled into a transmission fiber and interacts with the optical transmission medium during transmission, generating Fresnel reflection light and reverse Rayleigh scattering light. Due to certain characteristics and conditions of the fiber itself including for example a fiber connector, a fiber fusion joint, fiber bending or the like, a discontinuous hopping signal deviating from the reference time-domain spectrum may be produced for the detection light at these points, a part of which may return to the photodetector along the same path. A distance between the event point and the detection light exiting point may be calculated based on time from transmitting the signal to receiving the returning signal and speed of light transmission in the fiber medium. In addition, nature of the fault or event may be deduced by analyzing characteristics of the hopping point. In addition to the fiber point events (fiber connector, fiber fusion joint, fiber bending or the like), overall performance of the transmission cable such as fiber type, dispersion coefficient, attenuation coefficient and the like may also be estimated to a certain extent. Accordingly, a network management system may use the optical time-domain analyzer to analyze and estimate the condition of the fiber cross-segment, especially when upgrading, repairing or commissioning the network, and the obtained information may be used as an important reference for engineers or network management operators.

A conventional optical time-domain reflectometer usually requires an additional access to the optical fiber network and is used as a detection instrument, incurring high cost and additional overhead.

The fiber amplifier is a device for regenerative amplification of the optical signals in an optical fiber transmission link. As the optical signals continuously attenuate during transmission along the optical fiber cable, they may have an optical power already below a reception threshold when they arrive at a receiver. Therefore, the optical fiber amplifier is needed to regeneratively amplify the optical signals, thereby extending the transmission distance of the optical signals.

A Raman optical fiber amplifier is an optical fiber amplifier that uses the fiber transmission medium itself as a gain medium and utilizes a signal light amplification principle of stimulated Raman scattering. It has excellent characteristics such as a low noise index and a long single cross-segment transmission distance.

The conventional Raman optical fiber amplifier has some disadvantages such as the maintenance cost is high, the end face would easily be ablated due to contamination, the quality of optical amplification is highly susceptible to the quality of the transmission fiber especially a near end thereof, and the accuracy of gain locking highly depends on type and parameters of the fibers at the field site.

On the other hand, as the optical communication industry requires larger and larger transmission bandwidth, the conventional C-band becomes insufficient. A C+L band transmission system greatly expands the carrying capacity of the conventional system. A Raman optical fiber amplifier for the C+L band has, as compared with the conventional Raman optical fiber amplifier for the C band, a different Raman pump configuration such as a 149X Raman pump laser being added. However, even for the Raman optical fiber amplifier of the C+L band, the existing detection method still uses an independent optical time-domain reflectometer for ODTP detection. The existing detection method could not meet the requirements about convenience and efficiency in a more complicated device environment.

Therefore, it is an urgent task to overcome the above shortcomings in the art.

SUMMARY

A technical problem to be solved in the disclosure is as follows: the conventional optical time-domain reflectometer usually requires an additional access to an optical fiber network and is used as a detection instrument, leading to a high cost and an extra overhead. And the conventional Raman optical fiber amplifier has disadvantages as follows: the maintenance cost is high, the end face would easily be ablated due to contamination, the quality of optical amplification is highly susceptible to the quality of the transmission fiber especially a near end thereof, and the accuracy of gain locking highly depends on type and parameters of the fibers at the field site. An urgent task is to propose an efficient optical time-domain reflection detection in the context of a Raman optical fiber amplifier.

The present disclosure proposes solutions as follows:

In a first aspect, the present disclosure provides an optical amplifier assembly capable of dynamically performing optical time-domain reflection detection comprising a C-band Raman pump, an L-band Raman pump, a circulator, a first optical wavelength division multiplexer, a second optical wavelength division multiplexer, a signal light splitters, a first photodetector, a second photodetector, a third photodetector and a processor, wherein specifically:

An output port of the L-band Raman pump is connected to a first input end of the circulator, a first output port and a second output port of the circulator are respectively connected to a second input port of the second optical wavelength division multiplexer and the third photodetector, a third input port of the second optical wavelength division multiplexer is connected to the C-band Raman pump, an output port of the second optical wavelength division multiplexer is used for connection with a transmission optical fiber, and a first input port of the second optical wavelength division multiplexer is connected to a signal optical path;

The signal light splitter is connected in series in the signal optical path, and its optical splitting port is connected to an input port of the first optical wavelength division multiplexer, and two output ports of the first optical wavelength division multiplexer are connected to the first photodetector and the second photodetector respectively;

Data transmission ports of the C-band Raman pump, the L-band Raman pump, the first photodetector, the second photodetector and the third photodetector are connected to the processor.

Preferably, the L-band Raman pump has two operating modes comprising an L-band Raman optical fiber amplifier operating mode and an optical time-domain reflection detection mode.

Preferably, the processor operates to obtain signal light intensity detection signals from the first photodetector and the second photodetector, and send a control signal to the L-band Raman pump when it is determined that the signal light intensity in the second photodetector is lower than a first preset threshold, so that the L-band Raman pump enters into the optical time-domain reflection detection mode;

The processor further operates to send a control signal to the L-band Raman pump when it is determined that the signal light intensity in the second photodetector is greater than or equal to the first preset threshold, so that the L-band Raman pump enters into the L-band Raman optical fiber amplifier operating mode.

Preferably, the processor operates to obtain signal light intensity detection signals from the first photodetector and the second photodetector, and send a control signal to the C-band Raman pump when it is determined that the signal light intensity in the first photodetector is lower than a second preset threshold and the signal light intensity in the second detector is lower than the first preset threshold, so that the C-band Raman pump enters into a standby mode;

The processor further operates to send a control signal to the C-band Raman pump when it is determined that the signal light intensity in the first photodetector is greater than or equal to the second preset threshold and/or the signal light intensity in the second photodetector is greater than the first preset threshold, so that the C-band Raman pump enters into the C-band Raman optical fiber amplifier operating mode.

In a second aspect, the present disclosure further provides an optical amplifier assembly capable of dynamically performing optical time-domain reflection detection comprising a C-band Raman pump, an L-band Raman pump, a circulator, a first optical wavelength division multiplexer, a second optical wavelength division multiplexer, a signal light splitter, a first photodetector, a second photodetector, a third photodetector and a processor, wherein specifically:

An output port of the C-band Raman pump is connected to a first input end of the circulator, a first output port and a second output port of the circulator are connected to a second input port of the second optical wavelength division multiplexer and the third photodetector, respectively, a third input port of the second optical wavelength division multiplexer is connected to the L-band Raman pump, an output port of the second optical wavelength division multiplexer is for connection with a transmission optical fiber, and a first input port of the second optical wavelength division multiplexer is connected to a signal optical path;

The signal light splitter is connected in series in the signal optical path, and its optical splitting port is connected to an input port of the first optical wavelength division multiplexer, and two output ports of the first optical wavelength division multiplexer are connected to the first photodetector and the second photodetector respectively.

Data transmission ports of the C-band Raman pump, the L-band Raman pump, the first photodetector, the second photodetector and the third photodetector are connected to the processor.

Preferably, the C-band Raman pump has two operating modes comprising a C-band Raman optical fiber amplifier operating mode and an optical time-domain reflection detection mode, wherein specifically:

The processor operates to obtain signal light intensity detection signals from the first photodetector and the second photodetector, and send a control signal to the C-band Raman pump when it is determined that the signal light intensity in the first photodetector is lower than a second preset threshold and the signal light intensity in the second photodetector is lower than a first preset threshold, so that the C-band Raman pump enters into the optical time-domain reflection detection mode;

The processor further operates to send a control signal to the C-band Raman pump when it is determined that the signal light intensity in the first photodetector is greater than or equal to the second preset threshold and/or the signal light intensity in the second photodetector is greater than or equal to the first preset threshold, so that the C-band Raman pump enters into the C-band Raman optical fiber amplifier operating mode.

In a third aspect, the present disclosure further provides an optical amplifier assembly capable of dynamically performing optical time-domain reflection detection comprising a C-band Raman pump, an L-band Raman pump, a circulator, a first optical wavelength division multiplexer, a second optical wavelength division multiplexer, a third optical wavelength division multiplexer, a signal light splitter, a first photodetector, a second photodetector, a third photodetector and a processor, wherein specifically:

An output port of the L-band Raman pump is connected to a first input end of the circulator, a first output port and a second output port of the circulator are connected to a second input of the third optical wavelength division multiplexer and the third photodetector respectively, a first input port of the third optical wavelength division multiplexer is connected to the C-band Raman pump, an output port of the third optical wavelength division multiplexer is connected to a second input port of the second optical wavelength division multiplexer, the output port of the second optical wavelength division multiplexer is used for connection with a transmission fiber, and a first input port of the second optical wavelength division multiplexer is connected to a signal optical path;

The signal light splitter is connected in series in the signal optical path, and its optical splitting port is connected to an input port of the first optical wavelength division multiplexer, and two output ports of the first optical wavelength division multiplexer are connected to the first photodetector and the second photodetector respectively;

Data transmission ports of the C-band Raman pump, the L-band Raman pump, the first photodetector, the second photodetector and the third photodetector are connected to the processor.

Preferably, the L-band Raman pump has two operating modes comprising an L-band Raman optical fiber amplifier operating mode and an optical time-domain reflection detection mode.

Preferably, the processor operates to obtain the signal light intensity detection signals from the first photodetector and the second photodetector, and send a control signal to the L-band Raman pump when it is determined that the signal light intensity in the second photodetector is lower than a first preset threshold, so that the L-band Raman pump enters into the optical time-domain reflection detection mode;

The processor further operates to send a control signal to the L-band Raman pump when it is determined that the signal light intensity in the second photodetector is greater than or equal to the first preset threshold, so that the L-band Raman pump enters into the L-band Raman optical fiber amplifier operating mode.

Preferably, the processor operates to obtain signal light intensity detection signals from the first photodetector and the second photodetector, and send a control signal to the C-band Raman pump when it is determined that the signal light intensity in the first photodetector is lower than a second preset threshold and the signal light intensity in the second photodetector is lower than a first preset threshold, so that the C-band Raman pump enters into a standby mode;

The processor further operates to send a control signal to the C-band Raman pump when it is determined that the signal light intensity in the first photodetector is greater than or equal to the second preset threshold and/or the signal light intensity in the second photodetector is greater than the first preset threshold, so that the C-band Raman pump enters into the C-band Raman optical fiber amplifier operating mode.

In a fourth aspect, the present disclosure further provides an optical amplifier assembly capable of dynamically performing optical time-domain reflection detection comprising a first sub-unit of a C-band Raman pump, a second sub-unit of the C-band Raman pump, an L-band Raman pump, a circulator, a first optical wavelength division multiplexer, a second optical wavelength division multiplexer, a third optical wavelength division multiplexer, a fourth optical wavelength division multiplexer, a signal light splitter, a first photodetector, a second photodetector, a third photodetector and a processor, wherein specifically:

An output port of the L-band Raman pump is connected to a first input end of the circulator, a first output port and a second output port of the circulator are connected to a second input port of the third optical wavelength division multiplexer and the third photodetector respectively, a first input port of the third optical wavelength division multiplexer is connected to an output port of the fourth optical wavelength division multiplexer, an output port of the third optical wavelength division multiplexer is connected to a second input port of the second optical wavelength division multiplexers, an output port of the second optical wavelength division multiplexer is used for connection with a transmission fiber, a first input port of the second optical wavelength division multiplexer is connected to a signal optical path; a first input port and a second input port of the fourth optical wavelength division multiplexer are connected to the first sub-unit of the C-band Raman pump and the second sub-unit of the C-band Raman pump respectively;

The signal light splitter is connected in series in the signal optical path, and its optical splitting port is connected to an input port of the first optical wavelength division multiplexer, and two output ports of the first optical wavelength division multiplexer are connected to the first photodetector and the second photodetector respectively.

Data transmission ports of the first sub-unit of the C-band Raman pump, the second sub-unit of the C-band Raman pump, the L-band Raman pump, the first photodetector, the second photodetector and the third photodetector are connected to the processor.

Preferably, the processor operates to obtain the signal light intensity detection signals from the first photodetector and the second photodetector, and send a control signal to the L-band Raman pump when it is determined that the signal light intensity in the second photodetector is lower than a first preset threshold, so that the L-band Raman pump enters into the optical time-domain reflection detection mode;

The processor further operates to send a control signal to the L-band Raman pump when it is determined that the signal light intensity in the second photodetector is greater than or equal to the first preset threshold, so that the L-band Raman pump enters into the L-band Raman optical fiber amplifier operating mode.

Preferably, the processor operates to obtain signal light intensity detection signals from the first photodetector and the second photodetector, and send a control signal to the first sub-unit of the C-band Raman pump and the second sub-unit of the C-band Raman pump when it is determined that the signal light intensity in the first photodetector is lower than a second preset threshold and the signal light intensity in the second photodetector is lower than the first preset threshold, so that the first sub-unit of the C-band Raman pump and the second sub-unit of the C-band Raman pump enter into a standby mode;

The processor further operates to send a control signal to the first sub-unit of the C-band Raman pump and the second sub-unit of the C-band Raman pump when it is determined that the signal light intensity in the first photodetector is greater than or equal to the second preset threshold and/or the signal light intensity in the second photodetector is greater than the first preset threshold, so that the first sub-unit of the C-band Raman-pump and the second sub-unit of the C-band Raman-pump enter into the C-band Raman optical fiber amplifier operating mode.

In a fifth aspect, the present disclosure further provides an optical amplifier assembly capable of dynamically performing optical time-domain reflection detection comprising a first sub-unit of a C-band Raman pumped, a second sub-unit of the C-band Raman pump, an L-band Raman pump, a circulator, a first optical wavelength division multiplexer, a second optical wavelength division multiplexer, a third optical wavelength division multiplexer, a fourth optical wavelength division multiplexer, a signal light splitter, a first photodetector, a second photodetector, a third photodetector and a processor, wherein specifically:

An output port of the L-band Raman pump is connected to a first input end of the circulator, a first output port and a second output port of the circulator are connected to a second input port of the fourth optical wavelength division multiplexer and the third photodetector respectively, a first input port of the third optical wavelength division multiplexer is connected to an output port of the fourth optical wavelength division multiplexer, an output port of the third optical wavelength division multiplexer is connected to a second input port of the second optical wavelength division multiplexers, an output port of the second optical wavelength division multiplexer is for connection with a transmission fiber, and a first input port of the second optical wavelength division multiplexer is connected to a signal optical path; wherein a second input port of the third optical wavelength division multiplexer is connected to the second sub-unit of the C-band Raman pump; a first input port of the fourth optical wavelength division multiplexer is connected to the first sub-unit of the C-band Raman pump;

The signal light splitter is connected in series in the signal optical path, and its optical splitting port is connected to an input port of the first optical wavelength division multiplexer, and two output ports of the first optical wavelength division multiplexer are connected to the first photodetector and the second photodetector respectively;

Data transmission ports of the first sub-unit of the C-band Raman pump, the second sub-unit of the C-band Raman pump, the L-band Raman pump, the first photodetector, the second photodetector and the third photodetector are connected to the processor.

Preferably, the processor operates to obtain the signal light intensity detection signals from the first photodetector and the second photodetector, and send a control signal to the L-band Raman pump when it is determined that the signal light intensity in the second photodetector is lower than a first preset threshold, so that the L-band Raman pump enters into the optical time-domain reflection detection mode;

The processor further operates to send a control signal to the L-band Raman pump when it is determined that the signal light intensity in the second photodetector is greater than or equal to the first preset threshold, so that the L-band Raman pump enters into the L-band Raman optical fiber amplifier operating mode.

Preferably, the processor operates to obtain signal light intensity detection signals from the first photodetector and the second photodetector, and send a control signal to the first sub-unit of the C-band Raman pump and the second sub-unit of the C-band Raman pump when it is determined that the signal light intensity in the first photodetector is lower than a second preset threshold and the signal light intensity in the second photodetector is lower than the first preset threshold, so that the first sub-unit of the C-band Raman pump and the second sub-unit of the C-band Raman pumped enter into a standby mode;

The processor further operates to send a control signal to the first sub-unit of the C-band Raman pump and the second sub-unit of the C-band Raman pump when it is determined that the signal light intensity in the first photodetector is greater than or equal to the second preset threshold and/or the signal light intensity in the second photodetector is greater than the first preset threshold, so that the first sub-unit of the C-band Raman pump and the second sub-unit of the C-band Raman pump enter into the C-band Raman optical fiber amplifier operating mode.

In a sixth aspect, the present disclosure further provides an optical amplifier assembly capable of dynamically performing optical time-domain reflection detection comprising a first sub-unit of a C-band Raman pumped, a second sub-unit of the C-band Raman pump, an L-band Raman pump, a circulator, a first optical wavelength division multiplexer, a second optical wavelength division multiplexer, a third optical wavelength division multiplexer, a fourth optical wavelength division multiplexer, a signal light splitter, a first photodetector, a second photodetector, a third photodetector and a processor, wherein specifically:

An output port of the L-band Raman pump is connected to a first input end of the circulator, a first output port and a second output port of the circulator are connected to a second input port of the second optical wavelength division multiplexer and the third photodetector respectively, a first input port of the third optical wavelength division multiplexer is connected to a signal optical path, and an output port of the third optical wavelength division multiplexer is connected to a first input port of the second optical wavelength division multiplexer, wherein an output port of the second optical wavelength division multiplexer is used for connection with a transmission fiber; wherein the second input port of the third optical wavelength division multiplexer is connected to an output port of the fourth optical wavelength division multiplexer; a first input port and a second input port of the fourth optical wavelength division multiplexer are connected to the first sub-unit of the C-band Raman pump and the second sub-unit of the C-band Raman pump respectively;

The signal light splitter is connected in series in the signal optical path, and its optical splitting port is connected to an input port of the first optical wavelength division multiplexer, and two output ports of the first optical wavelength division multiplexer are connected to the first photodetector and the second photodetector respectively.

Data transmission ports of the first sub-unit of the C-band Raman pump, the second sub-unit of the C-band Raman pump, the L-band Raman pump, the first photodetector, the second photodetector and the third photodetector are connected to the processor.

Preferably, the processor operates to obtain the signal light intensity detection signals from the first photodetector and the second photodetector, and send a control signal to the L-band Raman pump when it is determined that the signal light intensity in the second photodetector is lower than a first preset threshold, so that the L-band Raman pump enters into an optical time-domain reflection detection mode;

The processor further operates to send a control signal to the L-band Raman pump when it is determined that the signal light intensity in the second photodetector is greater than or equal to the first preset threshold, so that the L-band Raman pump enters into an L-band Raman optical fiber amplifier operating mode.

Preferably, the processor operates to obtain signal light intensity detection signals from the first photodetector and the second photodetector, and send a control signal to the first sub-unit of the C-band Raman pump and the second sub-unit of the C-band Raman pump when it is determined that the signal light intensity in the first photodetector is lower than a second preset threshold and the signal light intensity in the second photodetector is lower than the first preset threshold, so that first sub-unit of the C-band Raman pump and the second sub-unit of the C-band Raman pumped enter into a standby mode;

The processor further operates to send a control signal to the first sub-unit of the C-band Raman pump and the second sub-unit of the C-band Raman pump when it is determined that the signal light intensity in the first photodetector is greater than or equal to the second preset threshold and/or the signal light intensity in the second photodetector is greater than the first preset threshold, so that the first sub-unit of the C-band Raman-pump and the second sub-unit of the C-band Raman-pumped enter into the C-band Raman optical fiber amplifier operating mode.

In a seventh aspect, the present disclosure further provides an optical amplifier assembly capable of dynamically performing optical time-domain reflection detection comprising a first sub-unit of a C-band Raman pump, a second sub-unit of the C-band Raman pump, an L-band Raman pump, a circulator, a first optical wavelength division multiplexer, a second optical wavelength division multiplexer, a third optical wavelength division multiplexer, a fourth optical wavelength division multiplexer, a signal light splitter, a first photodetector, a second photodetector, a third photodetector and a processor, wherein specifically:

An output port of the L-band Raman pump is connected to a first input end of the circulator, a first output port and a second output port of the circulator are connected to a second input port of the third optical wavelength division multiplexer and the third photodetector respectively, a first input port of the third optical wavelength division multiplexer is connected to a signal optical path, an output port of the third optical wavelength division multiplexer is connected to a first input port of the second optical wavelength division multiplexer, wherein an output port of the second optical wavelength division multiplexer is for connection with a transmission fiber; wherein a first input port and a second input port of the fourth optical wavelength division multiplexer are connected to the first sub-unit of the C-band Raman pump and the second sub-unit of the C-band Raman pump respectively, and an output port of the fourth optical wavelength division multiplexer is connected to a second input port of the second optical wavelength division multiplexer;

The signal light splitter is connected in series in the signal optical path, and its optical splitting port is connected to an input port of the first optical wavelength division multiplexer, and two output ports of the first optical wavelength division multiplexer are connected to the first photodetector and the second photodetector respectively;

Data transmission ports of the first sub-unit of the C-band Raman pump, the second sub-unit of the C-band Raman pump, the L-band Raman pump, the first photodetector, the second photodetector and the third photodetector are connected to the processor.

Preferably, the processor operates to obtain the signal light intensity detection signals from the first photodetector and the second photodetector, and send a control signal to the L-band Raman pump when it is determined that the signal light intensity in the second photodetector is lower than a first preset threshold, so that the L-band Raman pump enters into an optical time-domain reflection detection mode;

The processor further operates to send a control signal to the L-band Raman pump when it is determined that the signal light intensity in the second photodetector is greater than or equal to the first preset threshold, so that the L-band Raman pump enters into an L-band Raman optical fiber amplifier operating mode.

Preferably, the processor operates to obtain signal light intensity detection signals from the first photodetector and the second photodetector, and send a control signal to the first sub-unit of the C-band Raman pump and the second sub-unit of the C-band Raman pump when it is determined that the signal light intensity in the first photodetector is lower than a second preset threshold and the signal light intensity in the second photodetector is lower than a first preset threshold, so that the first sub-unit of the C-band Raman pump and the second sub-unit of the C-band Raman pump enter into a standby mode;

The processor further operates to send a control signal to the first sub-unit of the C-band Raman pump and the second sub-unit of the C-band Raman pump when it is determined that the signal light intensity in the first photodetector is greater than or equal to the second preset threshold and/or the signal light intensity in the second photodetector is greater than the first preset threshold, so that the first sub-unit of the C-band Raman-pump and the second sub-unit of the C-band Raman-pump enter into a C-band Raman optical fiber amplifier operating mode.

In an eighth aspect, the present disclosure further provides a detection method for dynamical optical time-domain reflection detection by using the optical amplifier assembly capable of dynamically performing optical time-domain reflection detection according to any one of claims 1-4, 7-22, the detection method comprising:

Obtaining signal light intensity detection signals from the first photodetector and the second photodetector, and sending a control signal to the L-band Raman pump when it is determined that the signal light intensity in the second photodetector is lower than a first preset threshold, so that the L-band Raman pump enters into an optical time-domain reflection detection mode;

The processor further operates to send a control signal to the L-band Raman pump when it is determined that the signal light intensity in the second photodetector is greater than or equal to the first preset threshold, so that the L-band Raman pump enters into an L-band Raman optical fiber amplifier operating mode.

Preferably, the detection method further comprises:

Obtaining the signal light intensity detection signals of the first photodetector and the second photodetector, and sending a control signal to the first sub-unit of the C-band Raman pump and the second sub-unit of the C-band Raman pump when it is determined that the signal light intensity in the first photodetector is lower than the second preset threshold and the signal light intensity in the second photodetector is lower than the first preset threshold, so that the first sub-unit of the C-band Raman pump and the second sub-unit of the C-band Raman pump enter into a standby mode;

The processor further operates to send a control signal to the first sub-unit of the C-band Raman pump and the second sub-unit of the C-band Raman pump when it is determined that the signal light intensity in the first photodetector is greater than or equal to the second preset threshold and/or the signal light intensity in the second photodetector is greater than the first preset threshold, so that the first sub-unit of the C-band Raman-pump and the second sub-unit of the C-band Raman-pumped enter into a C-band Raman optical fiber amplifier operating mode.

Compared with the prior arts, embodiments of the present disclosure has following advantages: in addition to serving for the basic functionality of the optical amplifier, the L-band Raman pump is also used as the OTDR detection light source, achieving multiple functions and greatly enhancing and improving performance and maintainability of the Raman optical fiber amplifier.

The system resource overhead and cost are also reduced, and the system architecture is simplified. The optical communication network will be under surveillance by the Raman optical fiber amplifier with the optical time-domain reflectometer functionality. Therefore, system maintenance, repairing, modification and updating would have improved efficiency, safety and reliability of the optical communication network would be enhanced, and operation performance and indexes of the Raman optical fiber amplifier itself are also improved.

By the tactical design and configuration, the L-band amplifying Raman pump laser is effectively reused for the L-band amplification and as the OTDR detection light source. In addition, as the L-band Raman pumping light has no interference with the C-band service signal light, it can be used for both the off-line OTDR detection and the on-line OTDR detection. Thus, the product functionalities are enhanced, the product design is simplified, and re-using of the product is increased.

BRIEF DESCRIPTION OF THE DRAWINGS

For a more clear description of the embodiments of the present disclosure or the technical solutions in the prior arts, the drawings to be used in the description of the embodiments or the prior arts will be briefly introduced below.

Obviously, the drawings are only for some embodiments of the present disclosure. Those with ordinary skills in the art may obtain other drawings based on these drawings without paying creative labor.

FIG. 7 is a structural diagram of another optical amplifier assembly capable of dynamically performing optical time-domain reflection detection in accordance with an embodiment of the present disclosure;

FIG. 8 is a flowchart showing operation of an optical amplifier assembly capable of dynamically performing optical time-domain reflection detection in accordance with an embodiment of the present disclosure;

DETAILED DESCRIPTION

Figure 1:
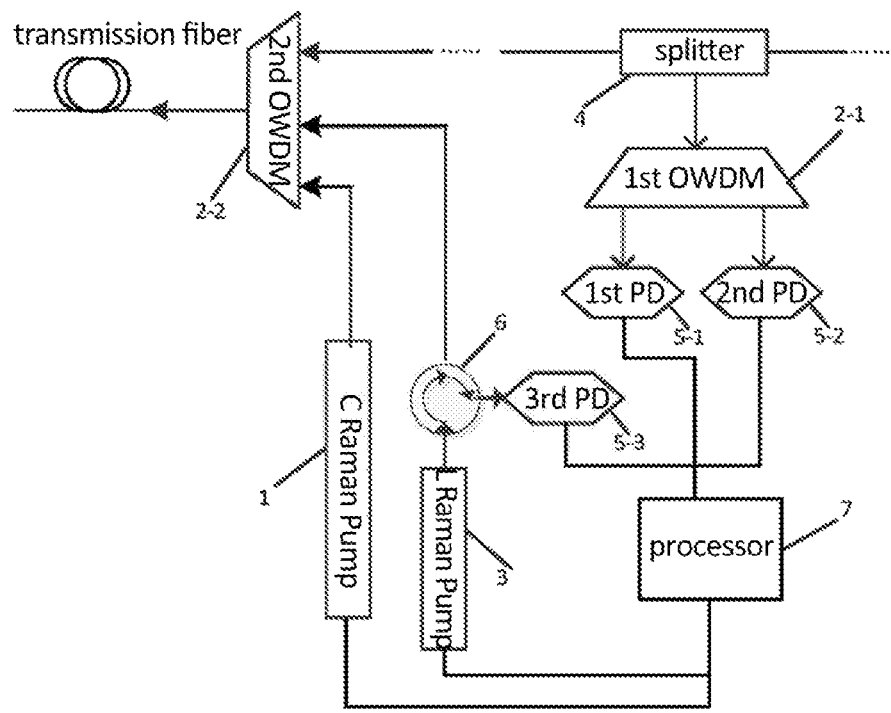
FIG. 1 is a structural diagram of an optical amplifier assembly capable of dynamically performing optical time-domain reflection detection in accordance with an embodiment of the present disclosure.

In order to make the objects, technical solutions and advantages of the present disclosure more obvious, the present disclosure is further described in detail below with reference to the accompanying drawings and embodiments. It shall be noted that the specific embodiments described herein are only for explaining the present disclosure but not for limiting the present disclosure.

In the description of the present disclosure, orientations or positional relationships indicated by terms "inside", "outside", "longitudinal", "horizontal", "upper", "lower", "top", "bottom" and the like are based on the orientations or positional relationships shown in the drawings and merely for the convenience of describing the present disclosure and do not mean that any apparatus or method in the present disclosure must be constructed and operated in a specific orientation disclosed in the present disclosure, and therefore should not be understood as a limitation to the present disclosure in any way.

In addition, the technical features involved in the various embodiments of the present disclosure described below may be combined with each other as long as they do not conflict with each other.

Embodiment 1

An embodiment of the present disclosure provides an optical amplifier assembly capable of dynamically performing optical time-domain reflection detection comprising, as shown in FIG. 1, a C-band Raman pump 1, an L-band Raman pump 3, a circulator 6, a first optical wavelength division multiplexer 2-1, a second optical wavelength division multiplexer 2-2, a signal light splitter 4, a first photodetector 5-1, a second photodetector 5-2, a third photodetector 5-3 and a processor 7.

An output port of the L-band Raman pump 3 is connected to a first input end of the circulator 6, and a first output port and a second output port of the circulator 6 are connected to a second input port of the second optical wavelength division multiplexer 2-2 and the third photodetector 5-3, respectively. A third input port of the second optical wavelength division multiplexers 2-2 is connected to the C-band Raman pump 1, an output port of the second optical wavelength division multiplexer 2-2 is connected to a transmission fiber, and a first input port of the second optical wavelength division multiplexer 2-2 is connected to a signal optical path.

The signal light splitter 4 is connected in series in the signal optical path, and its optical splitting port is connected to an input port of the first optical wavelength division multiplexer 2-1. The two output ports of the first optical wavelength division multiplexer 2-1 are connected to the first photodetector 5-1 and the second photodetector 5-2, respectively.

The C-band Raman pump 1, the L-band Raman pump 3, the first photodetector 5-1, the second photodetector 5-2 and the third photodetector 5-3 have their data transmission ports connected to the processor 7.

The embodiment of the present disclosure provides the optical amplifier assembly capable of dynamically performing optical time-domain reflection detection. It is noted that a prior art optical amplifier assembly including both the C-band Raman pump 1 and the L-band Raman pump 3 may be in a condition where the L-band Raman pump 3 does not operate in an L-band Raman optical fiber amplifier operating mode. In the optical amplifier assembly according to the embodiment of the present disclosure, the L-band Raman pump 3 in such a condition may effectively switch to an optical time-domain reflection detection mode. Therefore, the optical time-domain reflection detection may be carried out on the transmission fibers to provide a reference for signal light amplification, without modifying the entire optical path (that is, without an external OTDR (Optical Time-domain Reflectometer) detection apparatus connected to the optical path). For example, a fiber connection loss between the Raman amplifier and the transmission fiber, distribution of loss points in the transmission fiber, an attenuation coefficient of the transmission fiber and a dispersion coefficient of the transmission fiber may be measured.

In the embodiment of the present disclosure, in order to further support and improve efficient control of the processor 7 over the L-band Raman pump 3, an expandable implementation is provided, in which the L-band Raman pump 3 is provided with two operating modes, namely an L-band Raman optical fiber amplifier operating mode and an optical time-domain reflection detection mode. Configuration parameters relating to the two operating modes of the L-band Raman pump 3 may be stored in the processor 7. In specific implementations, the L-band Raman pump 3 and the C-band Raman pump 1 according to embodiments of the present disclosure are usually equipped with a driver module, and the configuration parameters for the two operating modes stored in the processor 7 may be sent from the processor 7 to the driver module for the corresponding band Raman pump at an appropriate time. Therefore, the L-band Raman pump 3 can switch between the two operating modes.

In the embodiment of the present disclosure, the processor 7 may obtain signal light intensity detection signals from the first photodetector 5-1 and the second photodetector 5-2, and send a control signal to the L-band Raman pump 3 when it is determined that the signal light intensity in the second photodetector 5-2 is lower than a first preset threshold, so that the L-band Raman pump 3 enters into the optical time-domain reflection detection mode.

The processor 7 may also send a control signal to the L-band Raman pump 3 when it is determined that the signal light intensity in the second photodetector 5-2 is greater than or equal to the first preset threshold, so that the L-band Raman pump 3 enters into the L-band Raman optical fiber amplifier operating mode.

The first preset threshold may be determined by calculation using the signal light intensity, the split ratio of the signal light splitter 4 and the attenuation index of the first optical wavelength division multiplexer 2-1 in the signal optical path. The first preset threshold is used to determine whether there is a valid L-band signal light transmitting in the current signal optical path. If the signal light intensity in the second photodetector 5-2 is lower than the first preset threshold value, it indicates that there is no valid L-band signal light transmitting in the current signal optical path and thus the L-band Raman pump 3 may switch to the optical time-domain reflection detection mode.

In the embodiment of the present disclosure, as the existing L-band Raman pump is expanded to have the two operating modes, in order to further improve accuracy of data collected by the third photodetector 5-3 in the case that the L-band Raman pump is in the optical time-domain reflection detection mode while there is no C-band signal light in the entire signal optical path, in an embodiment, it would be desirable to turn off the operating state of the C-band Raman pump 1 at a first time. However, turning off of the C-band Raman pump 1 is also affected by the operating state of the L-band Raman pump. In particular, in the case that the L-band Raman pump is in the power amplifier operating mode, the C-band Raman pump 1 still needs to be in the power amplifier operating mode no matter whether the signal light intensity detected by the first photodetector 5 is lower than the first preset threshold or not. Therefore, in combination with the embodiment of the present disclosure, there is also an expandable solution where the processor 7 is used to obtain the signal light intensity detection signals from the first photodetector 5-1 and the second photodetector 5-2, and to send a control signal to the C-band Raman pump 1 when it is determined that the signal light intensity in the first photodetector 5-1 is lower than a second preset threshold and the signal light intensity in the second photodetector 5-2 is lower than the first preset threshold, so that the C-band Raman pump 1 enters into a standby mode.

The processor 7 is further used to send a control signal to the C-band Raman pump 1 when it is determined that the signal light intensity in the first photodetector 5-1 is greater than or equal to the second preset threshold and/or the signal light intensity in the second photodetector 5-2 is greater than the first preset threshold, so that the C-band Raman pump 1 enters into the C-band Raman optical fiber amplifier operating mode.

The optical amplifier assembly structure provided in the embodiment of the present disclosure is the simplest one among various embodiments of the present disclosure.

Figure 2:
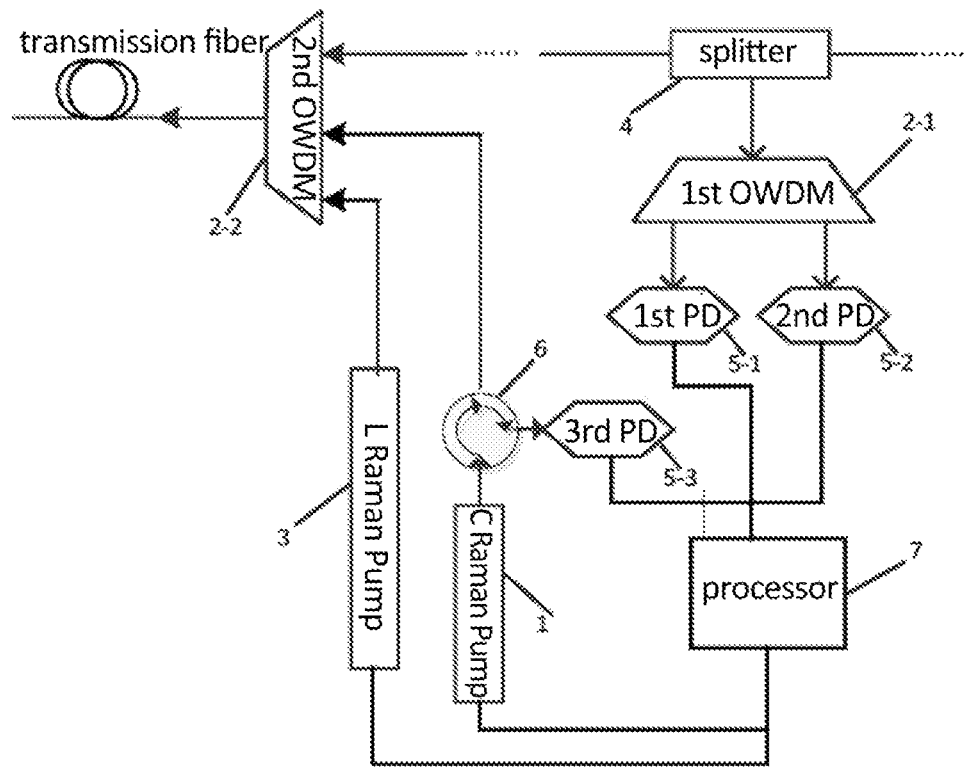
FIG. 2 is a structural diagram of another optical amplifier assembly capable of dynamically performing optical time-domain reflection detection in accordance with an embodiment of the present disclosure.

In the embodiment of the present disclosure, in addition to setting the L-band Raman pump to have the optical time-domain reflection detection mode and the L-band Raman optical fiber amplifier operating mode, it is also possible to set the C-band Raman pump to have both the above modes to solve the problems in the prior arts and to achieve the effects of the embodiments of the present disclosure. As shown in FIG. 2, an optical amplifier assembly capable of dynamically performing optical time-domain reflection detection comprises a C-band Raman pump, an L-band Raman pump, a circulator, a first optical wavelength division multiplexer, a second optical wavelength division multiplexer, a signal light splitter, a first photodetector, a second photodetector, a third photodetector and a processor.

An output port of the C-band Raman pump is connected to a first input end of the circulator, and a first output port and a second output port of the circulator are connected to a second input port of the second optical wavelength division multiplexer and the third photodetector, respectively. A third input port of the second optical wavelength division multiplexer is connected to the L-band Raman pump, an output port of the second optical wavelength division multiplexer is used for connection with the transmission optical fiber, and a first input port of the second optical wavelength division multiplexer is connected to the signal optical path.

The signal light splitter is connected in series in the signal optical path, and its optical splitting port is connected to an input port of the first optical wavelength division multiplexer, and two output ports of the first optical wavelength division multiplexer are connected to the first photodetector and the second photodetector, respectively.

The C-band Raman pump, the L-band Raman pump, the first photodetector, the second photodetector and the third photodetector have their data transmission ports connected to the processor.

The C-band Raman pump is provided with two operating modes, namely a C-band Raman optical fiber amplifier operating mode and an optical time-domain reflection detection mode.

The processor is used to obtain signal light intensity detection signals from the first photodetector and the second photodetector, and to send a control signal to the C-band Raman pump when it is determined that the signal light intensity in the first photodetector is lower than the second preset threshold and the signal light intensity in the second photodetector is lower than the first preset threshold, so that the C-band Raman pump enters into the optical time-domain reflection detection mode.

The processor is further used to send a control signal to the C-band Raman pump when it is determined that the signal light intensity in the first photodetector is greater than or equal to the second preset threshold and/or the signal light intensity in the second photodetector is greater than or equal to the first preset threshold, so that the C-band Raman pump enters into the C-band Raman optical fiber amplifier operating mode.

Compared to the solution of switching modes of the L-band Raman pump for ODTR detection in some embodiments of the present disclosure, the solution of switching modes of the C-band Raman pump for the ODTR detection is only applicable for off-line implementation. That is to say, the C-band Raman pump may switch to the ODTR detection mode to perform the ODTR detection only when neither the first photodetector 5-1 nor the second photodetector 5-2 detects a valid C-band optical signals or a valid L-band optical signal. On the contrary, mode switching of the L-band Raman pump may be online performed because whether or not the L-band Raman pump is in the power amplification mode is not limited by the C-band optical signal. The L-band Raman pump may switch to the ODTR detection mode to perform the ODTR detection as long as it is determined that intensity of the signal detected in the second photodetector 5-2 is lower than the first preset threshold. Therefore, switching mode of the L-band Raman pump for the ODTR detection is generally more efficient than switching mode of the C-band Raman pump for the ODTR detection.

It is also applicable for subsequent embodiments that the C-band Raman pump may be provided with two operating modes to carry out the ODTR detection. Therefore, the subsequent embodiments will be described in detail with respect to connection of the C-band Raman pump, the L-band Raman pump and the respective optical wavelength division multiplexers, and for simplicity of the description, only the two operation modes of the L-band Raman pump will be described. However, a person skilled in the art may apply the implementation of the C-band Raman pump with the two operating modes disclosed in this embodiment to the subsequent embodiments without paying any creative labor, and a detailed description thereof would be omitted.

Embodiment 2

Figure 3:
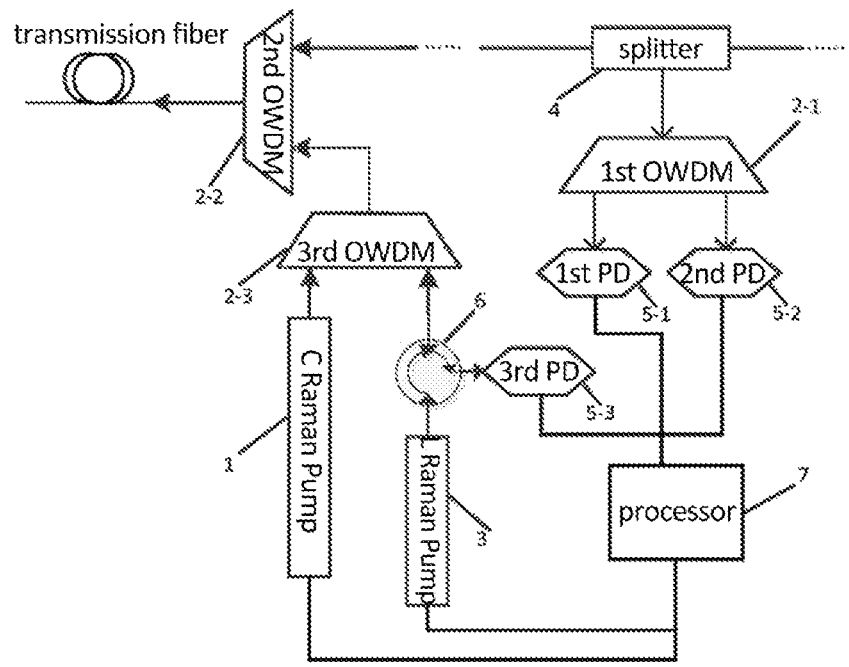
FIG. 3 is a structural diagram of another optical amplifier assembly capable of dynamically performing optical time-domain reflection detection in accordance with an embodiment of the present disclosure.

Embodiment 2 of the present disclosure provides an optical amplifier assembly capable of dynamically performing optical time-domain reflection detection, as shown in FIG. 3, comprising a C-band Raman pump 1, an L-band Raman pump 3, a circulator 6, a first optical wavelength division multiplexer 2-1, a second optical wavelength division multiplexer 2-2, a third optical wavelength division multiplexer 2-3, a signal light splitter 4, a first photodetector 5-1, a second photoelectric detector 5-2, a third photodetector 5-3 and a processor 7.

An output port of the L-band Raman pump 3 is connected to a first input end of the circulator 6, and a first output port and a second output port of the circulator 6 are connected to a second input port of the third optical wavelength division multiplexer 2-3 and the third photodetector 5-3, respectively. A first input port of the third optical wavelength division multiplexer 2-3 is connected to the C-band Raman pump 1, and an output port of the third optical wavelength division multiplexer 2-3 is connected to a second input port of the second optical wavelength division multiplexer 2-2. An output port of the second optical wavelength division multiplexer 2-2 is used for connection with a transmission fiber, and a first input port of the second optical wavelength division multiplexer 2-2 is connected to a signal optical path.

The signal light splitter 4 is connected in series in the signal optical path, and its optical splitting port is connected to an input port of the first optical wavelength division multiplexer 2-1, and two output ports of the first optical wavelength division multiplexer 2-1 are connected to the first photodetector 5-1 and the second photodetector 5-2, respectively.

The C-band Raman pump 1, the L-band Raman pump 3, the first photodetector 5-1, the second photodetector 5-2 and the third photodetector 5-3 have their data transmission ports connected to the processor 7.

The embodiment of the present disclosure provides the optical amplifier assembly capable of dynamically performing optical time-domain reflection detection. It is noted that a prior art optical amplifier assembly including both the C-band Raman pump 1 and the L-band Raman pump 3 may be in a condition where the L-band Raman pump 3 does not operate in an L-band Raman optical fiber amplifier operating mode. In the optical amplifier assembly according to the embodiment of the present disclosure, the L-band Raman pump 3 in such a condition may effectively switch to an optical time-domain reflection detection mode. Therefore, the optical time-domain reflection detection may be carried out on the transmission fibers to provide a reference for signal light amplification, without modifying the entire optical path (that is, without an external OTDR (Optical Time-domain Reflectometer) detection apparatus connected to the optical path). For example, a fiber connection loss between the Raman amplifier and the transmission fiber, distribution of loss points in the transmission fiber, an attenuation coefficient of the transmission fiber and a dispersion coefficient of the transmission fiber may be measured.

In the embodiment of the present disclosure, in order to further support and improve efficient control of the processor 7 over the L-band Raman pump 3, an expandable implementation is provided, in which the L-band Raman pump 3 is provided with two operating modes, namely an L-band Raman optical fiber amplifier operating mode and an optical time-domain reflection detection mode. Configuration parameters relating to the two operating modes of the L-band Raman pump 3 may be stored in the processor 7. In specific implementations, the L-band Raman pump 3 and the C-band Raman pump 1 according to embodiments of the present disclosure are usually equipped with a driver module, and the configuration parameters for the two operating modes stored in the processor 7 may be sent from the processor 7 to the driver module for the corresponding band Raman pump at an appropriate time. Therefore, the L-band Raman pump 3 can switch between the two operating modes.

The embodiment of the present disclosure can achieve the effects achieved in Embodiment 1. In the embodiment of the present disclosure, the processor 7 is used to obtain signal light intensity detection signals from the first photodetector 5-1 and the second photodetector 5-2, and to send a control signal to the L-band Raman pump 3 when it is determined that the signal light intensity in the second photodetector 5-2 is lower than the first preset threshold, so that the L-band Raman pump 3 enters into the optical time-domain reflection detection mode.

The processor 7 is further used to send a control signal to the L-band Raman pump 3 when it is determined that the signal light intensity in the second photodetector 5-2 is greater than or equal to the first preset threshold, so that the L-band Raman pump 3 enters into the L-band Raman optical fiber amplifier operating mode.

The first preset threshold may be determined by calculation using the signal light intensity, the split ratio of the signal light splitter and the attenuation index of the first optical wavelength division multiplexer in the signal optical path. The first preset threshold is used to determine whether there is a valid L-band signal light transmitting in the current signal optical path. If the signal light intensity in the second photodetector 5-2 is lower than the first preset threshold value, it indicates that there is no valid L-band signal light transmitting in the current signal optical path and thus the L-band Raman pump 3 may switch to the optical time-domain reflection detection mode.

In the embodiment of the present disclosure, as the existing L-band Raman pump is expanded to have the two operating modes, in order to further improve accuracy of data collected by the third photodetector 5-3 in the case that the L-band Raman pump is in the optical time-domain reflection detection mode while there is no C-band signal light in the entire signal optical path, in an embodiment, it would be desirable to turn off the operating state of the C-band Raman pump 1 at a first time. However, turning off of the C-band Raman pump 1 is also affected by the operating state of the L-band Raman pump. In particular, in the case that the L-band Raman pump is in the power amplifier operating mode, the C-band Raman pump 1 still needs to be in the power amplifier operating mode no matter whether the signal light intensity detected by the first photodetector 5 is lower than the first preset threshold or not. Therefore, in combination with the embodiment of the present disclosure, there is also an expandable solution where the processor 7 is used to obtain the signal light intensity detection signals from the first photodetector 5-1 and the second photodetector 5-2, and to send a control signal to the C-band Raman pump 1 when it is determined that the signal light intensity in the first photodetector 5-1 is lower than a second preset threshold and the signal light intensity in the second photodetector 5-2 is lower than the first preset threshold, so that the C-band Raman pump 1 enters into a standby mode.

The processor 7 is further used to send a control signal to the C-band Raman pump 1 when it is determined that the signal light intensity in the first photodetector 5-1 is greater than or equal to the second preset threshold and/or the signal light intensity in the second photodetector 5-2 is greater than the first preset threshold, so that the C-band Raman pump 1 enters into the C-band Raman optical fiber amplifier operating mode.

In the embodiment of the present disclosure, in addition to setting the L-band Raman pump to have the optical time-domain reflection detection mode and the L-band Raman optical fiber amplifier operating mode, it is also possible to set the C-band Raman pump to have both the above two modes to solve the problems in the prior arts and to achieve the effects of the embodiments of the present disclosure. For details please refer to the content described with reference to FIG. 2 in Embodiment 1, and it would not be repeated herein.

Embodiment 3

Figure 4:
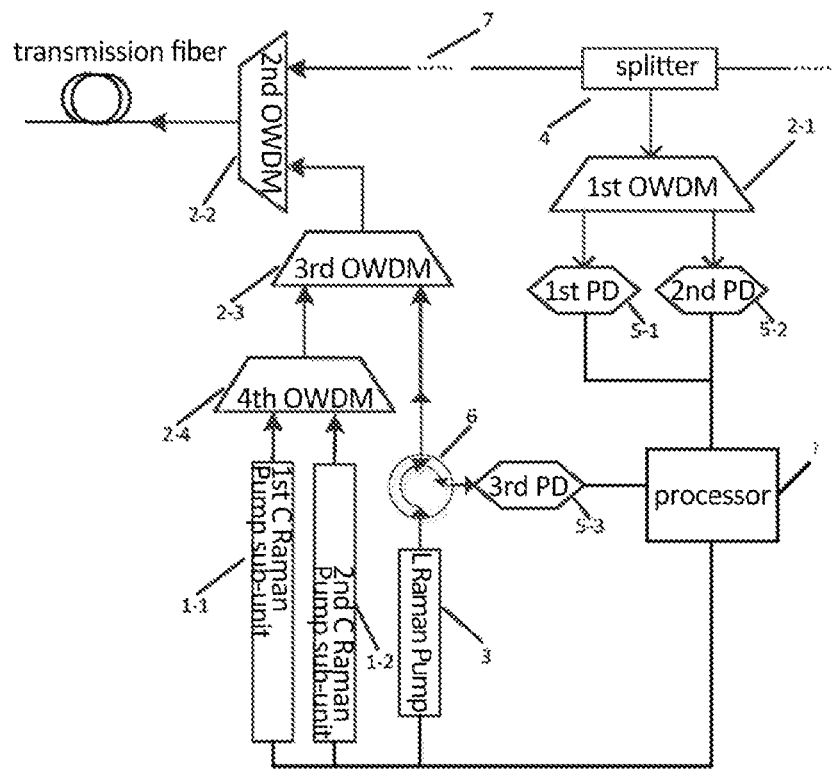
FIG. 4 is a structural diagram of another optical amplifier assembly capable of dynamically performing optical time-domain reflection detection in accordance with an embodiment of the present disclosure.

Embodiment 2 utilizes the core idea of reusing the L-band Raman pump 3 proposed in the present disclosure, but the optical amplifier assembly thereof is only one among a number of possible implementations. The embodiment of the present disclosure provides, based on the above core idea of reusing the L-band Raman pump 3, another optical amplifier assembly capable of dynamically performing optical time-domain reflection detection. As shown in FIG. 4, the optical amplifier assembly comprises a first sub-unit 1-1 of a C-band Raman pump, a second sub-unit 1-2 of the C-band Raman pump, an L-band Raman pump 3, a circulator 6, a first optical wavelength division multiplexer 2-1, a second optical wavelength division multiplexer 2-2, a third optical wavelength division multiplexer 2-3, a fourth optical wavelength division multiplexer 2-4, a signal light splitter 4, a first photodetector 5-1, a second photodetector 5-2, a third photodetector 5-3 and a processor 7.

An output port of the L-band Raman pump 3 is connected to a first input end of the circulator 6, and a first output port and a second output port of the circulator 6 are connected to a second input port of the third optical wavelength division multiplexer 2-3 and the third photodetector 5-3, respectively. A first input port of the third optical wavelength division multiplexer 2-3 is connected to an output port of the fourth optical wavelength division multiplexer 2-4, an output port of the third optical wavelength division multiplexer 2-3 is connected to a second input port of the second optical wavelength division multiplexer 2-2, an output port of the second optical wavelength division multiplexer 2-2 is used for connection with a transmission optical fiber, and a first input port of the second optical wavelength division multiplexer 2-2 is connected to a signal optical path. A first input port and a second input port of the fourth optical wavelength division multiplexer 2-4 are connected to the first sub-unit 1-1 of the C-band Raman pump and the second sub-unit 1-2 of the C-band Raman pump, respectively.

The signal light splitter 4 is connected in series in the signal optical path, and its optical splitting port is connected to an input port of the first optical wavelength division multiplexer 2-1, and two output ports of the first optical wavelength division multiplexer 2-1 are connected to the first photodetector 5-1 and the second photodetector 5-2, respectively.

The first sub-unit 1-1 of the C-band Raman pump, the second sub-unit 1-2 of the C-band Raman pump, the L-band Raman pump 3, the first photodetector 5-1, the second photodetector 5-2 and the third photodetector 5-3 have their data transmission ports connected to the processor 7.

In addition to achieving the beneficial effects in Embodiment 2, compared with Embodiment 2, the embodiment of the present disclosure is more suitable for applications where the signal light comprises C-band signal lights of multiple channels and a plurality of C-band Raman pumps are used, for example, for applications with a large gain and a long span. In the embodiment of the present disclosure, the number of the C-band Raman pumps (comprising the first sub-unit of the C-band Raman pump and the second sub-unit of the C-band Raman pump) is only one of various implementations. All embodiments obtained by adding additional C-band Raman pumps to the solution disclosed in the embodiment of the present disclosure fall within the protection scope of the present disclosure.

In the embodiment of the present disclosure, in order to further support and improve efficient control of the processor over the L-band Raman pump 3, an expandable implementation is provided, in which the L-band Raman pump 3 is provided with two operating modes, namely an L-band Raman optical fiber amplifier operating mode and an optical time-domain reflection detection mode. Configuration parameters relating to the two operating modes of the L-band Raman pump 3 may be stored in the processor. In specific implementations, the L-band Raman pump 3 and the C-band Raman pump 1 according to embodiments of the present disclosure are usually equipped with a driver module, and the configuration parameters for the two operating modes stored in the processor may be sent from the processor to the driver module for the corresponding band Raman pump at an appropriate time. Therefore, the L-band Raman pump 3 can switch between the two operating modes.

In the embodiment of the present disclosure, the processor 7 is used to obtain signal light intensity detection signals from the first photodetector 5-1 and the second photodetector 5-2, and to send a control signal to the L-band Raman pump 3 when it is determined that the signal light intensity in the second photodetector 5-2 is lower than the first preset threshold, so that the L-band Raman pump 3 enters into the optical time-domain reflection detection mode.

The processor 7 is further used to send a control signal to the L-band Raman pump 3 when it is determined that the signal light intensity in the second photodetector 5-2 is greater than or equal to the first preset threshold, so that the L-band Raman pump 3 enters into the L-band Raman optical fiber amplifier operating mode.

The first preset threshold may be determined by calculation using the signal light intensity, the split ratio of the signal light splitter and the attenuation index of the first optical wavelength division multiplexer in the signal optical path. The first preset threshold is used to determine whether there is a valid L-band signal light transmitting in the current signal optical path. If the signal light intensity in the second photodetector 5-2 is lower than the first preset threshold value, it indicates that there is no valid L-band signal light transmitting in the current signal optical path and thus the L-band Raman pump 3 may switch to the optical time-domain reflection detection mode.

In the embodiment of the present disclosure, as the existing L-band Raman pump is expanded to have the two operating modes, in order to further improve accuracy of data collected by the third photodetector 5-3 in the case that the L-band Raman pump is in the optical time-domain reflection detection mode while there is no C-band signal light in the entire signal optical path, in an embodiment, it would be desirable to turn off the operating state of the first sub-unit 1-1 of the C-band Raman pump and the second sub-unit 1-2 of the C-band Raman pump at a first time. However, turning off of the first sub-unit 1-1 of the C-band Raman pump and the second sub-unit 1-2 of the C-band Raman pump is also affected by the operating state of the L-band Raman pump. In particular, in the case that the L-band Raman pump is in the power amplifier operating mode, the first sub-unit 1-1 of the C-band Raman pump and the second sub-unit 1-2 of the C-band Raman pump still need to be in the power amplifier operating mode no matter whether the signal light intensity detected by the first photodetector 5 is lower than the first preset threshold or not. Therefore, in combination with the embodiment of the present disclosure, there is also an expandable solution where the processor 7 is used to obtain the signal light intensity detection signals from the first photodetector 5-1 and the second photodetector 5-2, and to send a control signal to the first sub-unit 1-1 of the C-band Raman pump and the second sub-unit 1-2 of the C-band Raman pump when it is determined that the signal light intensity in the first photodetector 5-1 is lower than a second preset threshold and the signal light intensity in the second photodetector 5-2 is lower than the first preset threshold, so that the first sub-unit 1-1 of the C-band Raman pump and the second sub-unit 1-2 of the C-band Raman pump enter into a standby mode.

The processor 7 is further used to send a control signal to the first sub-unit 1-1 of the C-band Raman pump and the second sub-unit 1-2 of the C-band Raman pump when it is determined that the signal light intensity in the first photodetector 5-1 is greater than or equal to the second preset threshold and/or the signal light intensity in the second photodetector is greater than the first preset threshold, such that the first sub-unit 1-1 of the C-band Raman pump and the second sub-unit 1-2 of the C-band Raman pump enter into the C-band Raman optical fiber amplifier operating mode.

In the embodiment of the present disclosure, in addition to setting the L-band Raman pump to have the optical time-domain reflection detection mode and the L-band Raman optical fiber amplifier operating mode, it is also possible to set the C-band Raman pump (one of the first sub-unit 1-1 of the C-band Raman pump and the second sub-unit 1-2 of the C-band Raman pump may be selected to implement the two operating modes) to have both the above two modes to solve the problems in the prior arts and to achieve the effects of the embodiments of the present disclosure. For details please refer to the content described with reference to FIG. 2 in Embodiment 1, and it would not be repeated herein.

Embodiment 4

Figure 5:
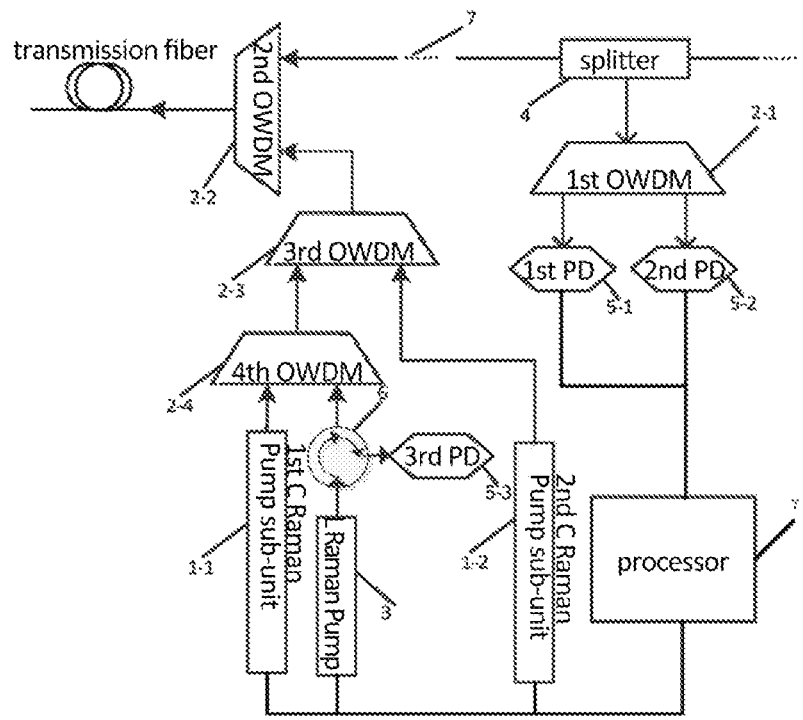
FIG. 5 is a structural diagram of another optical amplifier assembly capable of dynamically performing optical time-domain reflection detection in accordance with an embodiment of the present disclosure.

Embodiment 2 and Embodiment 3 utilizes the core idea of reusing the L-band Raman pump 3 proposed in the present disclosure, but the optical amplifier assemblies thereof are only two among a number of possible implementations. The embodiment of the present disclosure provides, based on the above core idea of reusing the L-band Raman pump 3, another optical amplifier assembly capable of dynamically performing optical time-domain reflection detection. As shown in FIG. 5, the optical amplifier assembly comprises a first sub-unit 1-1 of a C-band Raman pump, a second sub-unit 1-2 of the C-band Raman pump, an L-band Raman pump 3, a circulator 6, a first optical wavelength division multiplexer 2-1, a second optical wavelength division multiplexer 2-2, a third optical wavelength division multiplexer 2-3, a fourth optical wavelength division multiplexer 2-4, a signal light splitter 4, a first photodetector 5-1, a second photodetector 5-2, a third photodetector 5-3 and a processor 7.

An output port of the L-band Raman pump 3 is connected to a first input end of the circulator 6, and a first output port and a second output port of the circulator 6 are connected to a second input port of the fourth optical wavelength division multiplexer 2-4 and the third photodetector 5-3, respectively. A first input port of the third optical wavelength division multiplexer 2-3 is connected to an output port of the fourth optical wavelength division multiplexer 2-4, and an output port of the third optical wavelength division multiplexer 2-3 is connected to a second input port of the second optical wavelength division multiplexer 2-2. An output port of the second optical wavelength division multiplexer 2-2 is used for connection with a transmission fiber, a first input port of the second optical wavelength division multiplexer 2-2 is connected to a signal optical path. A second input port of the third optical wavelength division multiplexer 2-3 is connected to the second sub-unit 1-2 of the C-band Raman pump, and a first input port of the fourth optical wavelength division multiplexer 2-4 is connected to the first sub-unit 1-1 of the C-band Raman pump.

The signal light splitter 4 is connected in series in the signal optical path, and its optical splitting port is connected to an input port of the first optical wavelength division multiplexer 2-1, and two output ports of the first optical wavelength division multiplexer 2-1 are connected to the first photodetector 5-1 and the second photodetector 5-2, respectively.

The first sub-unit 1-1 of the C-band Raman pump, the second sub-unit 1-2 of the C-band Raman pump, the L-band Raman pump 3, the first photodetector 5-1, the second photodetector 5-2 and the third photodetector 5-3 have their data transmission ports connected to the processor 7.

The present embodiment can achieve the beneficial effects in Embodiment 3. Compared with Embodiment 3, the difference is: in Embodiment 3, the signal from the first sub-unit 1-1 of the C-band Raman pump and the signal from the second sub-unit 1-2 of the C-band Raman are first multiplexed with each other, and then the multiplexed signal is multiplexed with the signal from the L-band Raman pump, while in Embodiment 4, the signal from the first sub-unit 1-1 of the C-band Raman pump is first multiplexed with the signal from the L-band Raman pump, and then the multiplexed signal is multiplexed with the signal from the second sub-unit 1-2 of the C-band Raman pump. Both schemes may be used in practical implementations, and the difference therebetween is that the Raman pump light of a certain wavelength may has different attenuation in the multiplexing/demultiplexing process, resulting in a different fiber incident power.

For example, the difference between Embodiment 3 and Embodiment 4 in applications mainly lies in that Embodiment 4 is applicable to scenarios where requirements on the OTDR dynamic range and the L-band amplification gain are relatively low, while a requirement on the C-band Raman gain is relatively high. In such a case, compared with the optical amplifier assembly architecture shown in FIG. 4, the optical amplifier assembly architecture shown in FIG. 5 may better meet the above requirements.

In the embodiment of the present disclosure, in order to further support and improve efficient control of the processor over the L-band Raman pump 3, an expandable implementation is provided, in which the L-band Raman pump 3 is provided with two operating modes, namely an L-band Raman optical fiber amplifier operating mode and an optical time-domain reflection detection mode. Configuration parameters relating to the two operating modes of the L-band Raman pump 3 may be stored in the processor. In specific implementations, the L-band Raman pump 3 and the C-band Raman pump 1 according to embodiments of the present disclosure are usually equipped with a driver module, and the configuration parameters for the two operating modes stored in the processor may be sent from the processor to the driver module for the corresponding band Raman pump at an appropriate time. Therefore, the L-band Raman pump 3 can switch between the two operating modes.

In the embodiment of the present disclosure, the processor 7 is used to obtain signal light intensity detection signals from the first photodetector 5-1 and the second photodetector 5-2, and to send a control signal to the L-band Raman pump 3 when it is determined that the signal light intensity in the second photodetector 5-2 is lower than a first preset threshold, so that the L-band Raman pump 3 enters into the optical time-domain reflection detection mode.

The processor 7 is further used to send a control signal to the L-band Raman pump 3 when it is determined that the signal light intensity in the second photodetector 5-2 is greater than or equal to the first preset threshold, so that the L-band Raman pump 3 enters into the L-band Raman optical fiber amplifier operating mode.

The first preset threshold may be determined by calculation using the signal light intensity, the split ratio of the signal light splitter and the attenuation index of the first optical wavelength division multiplexer in the signal optical path. The first preset threshold is used to determine whether there is a valid L-band signal light transmitting in the current signal optical path. If the signal light intensity in the second photodetector 5-2 is lower than the first preset threshold value, it indicates that there is no valid L-band signal light transmitting in the current signal optical path and thus the L-band Raman pump 3 may switch to the optical time-domain reflection detection mode.

In the embodiment of the present disclosure, as the existing L-band Raman pump is expanded to have the two operating modes, in order to further improve accuracy of data collected by the third photodetector 5-3 in the case that the L-band Raman pump is in the optical time-domain reflection detection mode while there is no C-band signal light in the entire signal optical path, in an embodiment, it would be desirable to turn off the operating state of the first sub-unit 1-1 of the C-band Raman pump and the second sub-unit 1-2 of the C-band Raman pump at a first time. However, turning off of the first sub-unit 1-1 of the C-band Raman pump and the second sub-unit 1-2 of the C-band Raman pump is also affected by the operating state of the L-band Raman pump. In particular, in the case that the L-band Raman pump is in the power amplifier operating mode, the first sub-unit 1-1 of the C-band Raman pump and the second sub-unit 1-2 of the C-band Raman pump still need to be in the power amplifier operating mode no matter whether the signal light intensity detected by the first photodetector 5 is lower than the first preset threshold or not. Therefore, in combination with the embodiment of the present disclosure, there is also an expandable solution where the processor 7 is used to obtain the signal light intensity detection signals from the first photodetector 5-1 and the second photodetector 5-2, and to send a control signal to the first sub-unit 1-1 of the C-band Raman pump and the second sub-unit 1-2 of the C-band Raman pump when it is determined that the signal light intensity in the first photodetector 5-1 is lower than a second preset threshold and the signal light intensity in the second photodetector 5-2 is lower than the first preset threshold, so that the first sub-unit 1-1 of the C-band Raman pump and the second sub-unit 1-2 of the C-band Raman pump enter into a standby mode.

The processor 7 is further used to send a control signal to the first sub-unit 1-1 of the C-band Raman pump and the second sub-unit 1-2 of the C-band Raman pump when it is determined that the signal light intensity in the first photodetector 5-1 is greater than or equal to the second preset threshold and/or the signal light intensity in the second photodetector is greater than the first preset threshold, so that the first sub-unit 1-1 of the C-band Raman pump and the second sub-unit 1-2 of the C-band Raman pump enter into the C-band Raman optical fiber amplifier operating mode.

In the embodiment of the present disclosure, in addition to setting the L-band Raman pump to have the optical time-domain reflection detection mode and the L-band Raman optical fiber amplifier operating mode, it is also possible to set the C-band Raman pump (one of the first sub-unit 1-1 of the C-band Raman pump and the second sub-unit 1-2 of the C-band Raman pump may be selected to implement the two operating modes) to have both the above two modes to solve the problems in the prior arts and to achieve the effects of the embodiments of the present disclosure. For details please refer to the content described with reference to FIG. 2 in Embodiment 1, and it would not be repeated herein.

Example 5

Figure 6:
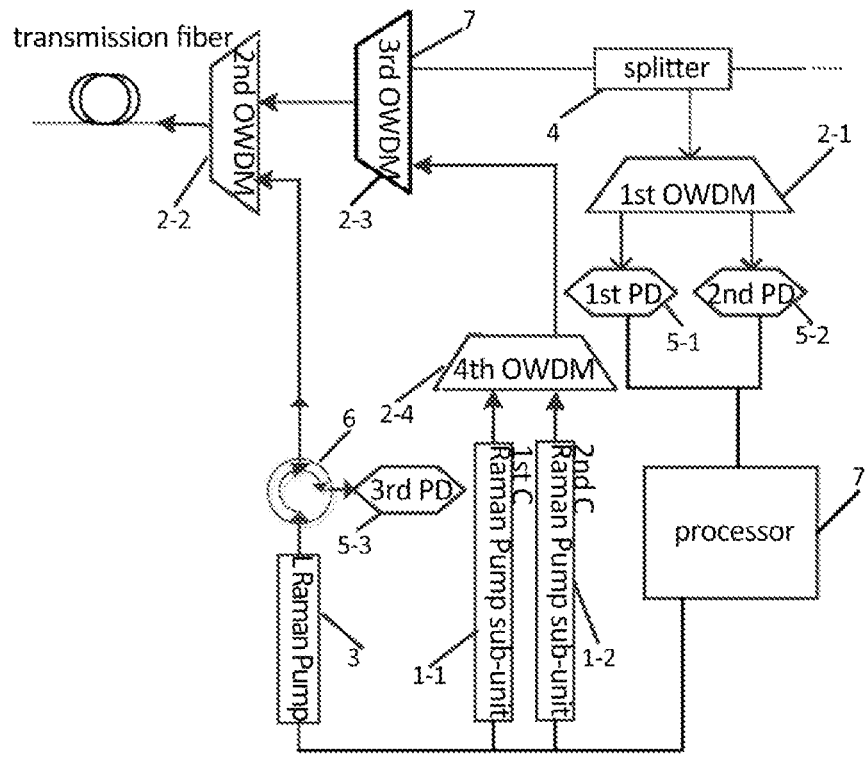
FIG. 6 is a structural diagram of another optical amplifier assembly capable of dynamically performing optical time-domain reflection detection in accordance with an embodiment of the present disclosure.

Following Embodiment 3 and Embodiment 4 proposed by expanding Embodiment 2, the embodiment of the present disclosure further propose a feasible implementation for an optical amplifier assembly architecture, as shown in FIG. 6, comprising a first sub-unit 1-1 of a C-band Raman pumped, a second sub-unit 1-2 of the C-band Raman pump, an L-band Raman pump 3, a circulator 6, a first optical wavelength division multiplexer 2-1, a second optical wavelength division multiplexer 2-2, a third optical wavelength division multiplexer 2-3, a fourth optical wavelength division multiplexer 2-4, a signal light splitter 4, a first photodetector 5-1, a second photodetector 5-2, a third photodetector 5-3 and a processor 7.

An output port of the L-band Raman pump 3 is connected to the first input end of the circulator 6, and a first output port and a second output port of the circulator 6 are connected to a second input port of the second optical wavelength division multiplexer 2-2 and the third photodetector 5-3, respectively. A first input port of the third optical wavelength division multiplexer 2-3 is connected to a signal optical path, and an output port of the third optical wavelength division multiplexer 2-3 is connected to the first input port of the second optical wavelength division multiplexer 2-2. An output port of the second optical wavelength division multiplexer 2-2 is used for connection with a transmission fiber, a second input port of the third optical wavelength division multiplexer 2-3 is connected to an output port of the fourth optical wavelength division multiplexer 2-4, and a first input port and a second input of the fourth optical wavelength division multiplexer 2-4 are connected to the first sub-unit 1-1 of the C-band Raman pump and the second sub-unit 1-2 of the C-band Raman pump, respectively.

The signal light splitter 4 is connected in series in the signal optical path, and its optical splitting port is connected to an input port of the first optical wavelength division multiplexer 2-1. Two output ports of the first optical wavelength division multiplexer 2-1 are connected to the first photodetector 5-1 and the second photodetector 5-2, respectively.

The first sub-unit 1-1 of the C-band Raman pump, the second sub-unit 1-2 of the C-band Raman pump, the L-band Raman pump 3, the first photodetector 5-1, the second photoelectric detector 5-2 and the third photodetector 5-3 have their data transmission ports connected to the processor 7.

The embodiment of the present disclosure can achieve the same beneficial effects as in Embodiment 2, and in addition, the L-band Raman pump 3 is further optimized with respect to its power amplification function (compared to Embodiment 3 and Embodiment 4). Compared with Embodiments 2-3, in this embodiment the highest power amplification effect to the L-band signal light may be achieved. In another perspective, because the fewest optical wavelength division multiplexers are cascaded to the L-band Raman pump 3 in this embodiment, this embodiment has advantages in sensitivity and accuracy of the optical time-domain reflection detection based on the same hardware, compared with the optical amplifier assembly capable of dynamically performing optical time-domain reflection detection according to any one of Embodiments 2-3.

In the embodiment of the present disclosure, in order to further support and improve efficient control of the processor over the L-band Raman pump 3, an expandable implementation is provided, in which the L-band Raman pump 3 is provided with two operating modes, namely an L-band Raman optical fiber amplifier operating mode and an optical time-domain reflection detection mode. Configuration parameters relating to the two operating modes of the L-band Raman pump 3 may be stored in the processor. In specific implementations, the L-band Raman pump 3 and the C-band Raman pump 1 according to embodiments of the present disclosure are usually equipped with a driver module, and the configuration parameters for the two operating modes stored in the processor may be sent from the processor to the driver module for the corresponding band Raman pump at an appropriate time. Therefore, the L-band Raman pump 3 can switch between the two operating modes.

In the embodiment of the present disclosure, the processor 7 is used to obtain signal light intensity detection signals from the first photodetector 5-1 and the second photodetector 5-2, and to send a control signal to the L-band Raman pump 3 when it is determined the signal light intensity in the second photodetector 5-2 is lower than the first preset threshold, so that the L-band Raman pump 3 enters into the L-band Raman optical fiber amplifier operating mode.

The processor 7 is further used to send a control signal to the L-band Raman pump 3 when it is determined that the signal light intensity in the second photodetector 5-2 is greater than or equal to the first preset threshold, so that the L-band Raman pump 3 enters into the L-band Raman optical fiber amplifier operating mode.

The first preset threshold may be determined by calculation using the signal light intensity, the split ratio of the signal light splitter and the attenuation index of the first optical wavelength division multiplexer in the signal optical path. The first preset threshold is used to determine whether there is a valid L-band signal light transmitting in the current signal optical path. If the signal light intensity in the second photodetector 5-2 is lower than the first preset threshold value, it indicates that there is no valid L-band signal light transmitting in the current signal optical path and thus the L-band Raman pump 3 may switch to the optical time-domain reflection detection mode.

In the embodiment of the present disclosure, as the existing L-band Raman pump is expanded to have the two operating modes, in order to further improve accuracy of data collected by the third photodetector 5-3 in the case that the L-band Raman pump is in the optical time-domain reflection detection mode while there is no C-band signal light in the entire signal optical path, in an embodiment, it would be desirable to turn off the operating state of the first sub-unit 1-1 of the C-band Raman pump and the second sub-unit 1-2 of the C-band Raman pump at a first time. However, turning off of the first sub-unit 1-1 of the C-band Raman pump and the second sub-unit 1-2 of the C-band Raman pump is also affected by the operating state of the L-band Raman pump. In particular, in the case that the L-band Raman pump is in the power amplifier operating mode, the first sub-unit 1-1 of the C-band Raman pump and the second sub-unit 1-2 of the C-band Raman pump still need to be in the power amplifier operating mode no matter whether the signal light intensity detected by the first photodetector 5 is lower than the first preset threshold or not. Therefore, in combination with the embodiment of the present disclosure, there is also an expandable solution where the processor 7 is used to obtain the signal light intensity detection signals from the first photodetector 5-1 and the second photodetector 5-2, and to send a control signal to the first sub-unit 1-1 of the C-band Raman pump and the second sub-unit 1-2 of the C-band Raman pump when it is determined that the signal light intensity in the first photodetector 5-1 is lower than a second preset threshold and the signal light intensity in the second photodetector 5-2 is lower than the first preset threshold, so that the first sub-unit 1-1 of the C-band Raman pump and the second sub-unit 1-2 of the C-band Raman pump enter into a standby mode.

The processor 7 is further used to send a control signal to the first sub-unit 1-1 of the C-band Raman pump and the second sub-unit 1-2 of the C-band Raman pump when it is determined that the signal light intensity in the first photodetector 5-1 is greater than or equal to the second preset threshold and/or the signal light intensity in the second photodetector is greater than the first preset threshold, so that first sub-unit 1-1 of the C-band Raman pump and the second sub-unit 1-2 of the C-band Raman pump enter into the C-band Raman optical fiber amplifier operating mode.

In the embodiment of the present disclosure, in addition to setting the L-band Raman pump to have the optical time-domain reflection detection mode and the L-band Raman optical fiber amplifier operating mode, it is also possible to set the C-band Raman pump (one of the first sub-unit 1-1 of the C-band Raman pump and the second sub-unit 1-2 of the C-band Raman pump may be selected to implement the two operating modes) to have both the above two modes to solve the problems in the prior arts and to achieve the effects of the embodiments of the present disclosure. For details please refer to the content described with reference to FIG. 2 in Embodiment 1, and it would not be repeated herein.

Embodiment 6

Following Embodiment 3, Embodiment 4 and Embodiment 5 proposed by expanding Embodiment 2, the embodiment of the present disclosure further propose a feasible implementation for an optical amplifier assembly architecture, as shown in FIG. 7, comprising a first sub-unit 1-1 of a C-band Raman pump, a second sub-unit 1-2 of the C-band Raman pump, an L-band Raman pump 3, a circulator 6, a first optical wavelength division multiplexer 2-1, a second optical wavelength division multiplexer 2-2, a third optical wavelength division multiplexer 2-3, a fourth optical wavelength division multiplexer 2-4, a signal light splitter 4, a first photodetector 5-1, a second photodetector 5-2, a third photodetector 5-3 and a processor 7.

An output port of the L-band Raman pump 3 is connected to a first input end of the circulator 6, and a first output port and a second output port of the circulator 6 are connected to a second input port of the third optical wavelength division multiplexer 2-3 and the third photodetector 5-3, respectively. A first input port of the third optical wavelength division multiplexer 2-3 is connected to a signal optical path, and an output port of the third optical wavelength division multiplexer 2-3 is connected to a first input port of the second optical wavelength division multiplexer 2-2. An output port of the second optical wavelength division multiplexer 2-2 is used for connection with a transmission fiber. A first input port and a second input port of the fourth optical wavelength division multiplexer 2-4 are connected to the first sub-unit 1-1 of the C-band Raman pump and the second sub-unit 1-2 of the C-band Raman pump, respectively, and an output port of the fourth optical wavelength division multiplexer 2-4 is connected to a second input port of the second optical wavelength division multiplexer 2-2.

The signal light splitter 4 is connected in series in the signal optical path, and its optical splitting port is connected to an input port of the first optical wavelength division multiplexer 2-1, and two output ports of the first optical wavelength division multiplexer 2-1 are connected to the first photodetector 5-1 and the second photodetector 5-2, respectively.

The first sub-unit 1-1 of the C-band Raman pump, the second sub-unit 1-2 of the C-band Raman pump, the L-band Raman pump 3, the first photodetector 5-1, the second photodetector 5-2 and the third photodetector 5-3 have their data transmission ports connected to the processor 7.

In addition to obtaining the same beneficial effects as Embodiment 2, this embodiment is contemplated for certain application scenarios. In the optical amplifier bank architecture proposed in this embodiment, light from the C-band Raman pump and the L-band Raman pump needs to pass through two optical wavelength division multiplexers before being coupled into the transmission fiber. This is a tradeoff solution for either the C-band signal optical amplification gain or the L-band amplification gain and the dynamic range of OTDR detection. It does not behave superiorly in one aspect or poorly in another aspect.

In summary, if the C-band Raman gain is desired, Embodiment 4 shown in FIG. 5 would be preferable; if the L-band Raman gain and the OTDR dynamic range are desired, Embodiment 5 shown in FIG. 6 would be preferable; if a performance balance is desired, then Embodiment 6 shown in FIG. 7 would be preferable.

In this embodiment, in order to further support and improve efficient control of the processor over the L-band Raman pump 3, an expandable implementation is provided, in which the L-band Raman pump 3 is provided with two operating modes, namely an L-band Raman optical fiber amplifier operating mode and an optical time-domain reflection detection mode. Configuration parameters relating to the two operating modes of the L-band Raman pump 3 may be stored in the processor. In specific implementations, the L-band Raman pump 3 and the C-band Raman pump 1 according to embodiments of the present disclosure are usually equipped with a driver module, and the configuration parameters for the two operating modes stored in the processor may be sent from the processor to the driver module for the corresponding band Raman pump at an appropriate time. Therefore, the L-band Raman pump 3 can switch between the two operating modes In the embodiment of the present disclosure, the processor 7 is used to obtain signal light intensity detection signals from the first photodetector 5-1 and the second photodetector 5-2, and to send a control signal to the L-band Raman pump 3 when it is determined that the signal light intensity in the second photodetector 5-2 is lower than the first preset threshold, so that the L-band Raman pump 3 enters into the optical time-domain reflection detection mode.

The processor 7 is further used to send a control signal to the L-band Raman pump 3 when it is determined that the signal light intensity in the second photodetector 5-2 is greater than or equal to the first preset threshold, so that the L-band Raman pump 3 enters into the L-band Raman optical fiber amplifier operating mode.

The first preset threshold may be determined by calculation using the signal light intensity, the split ratio of the signal light splitter and the attenuation index of the first optical wavelength division multiplexer in the signal optical path. The first preset threshold is used to determine whether there is a valid L-band signal light transmitting in the current signal optical path. If the signal light intensity in the second photodetector 5-2 is lower than the first preset threshold value, it indicates that there is no valid L-band signal light transmitting in the current signal optical path and thus the L-band Raman pump 3 may switch to the optical time-domain reflection detection mode.

In the embodiment of the present disclosure, as the existing L-band Raman pump is expanded to have the two operating modes, in order to further improve accuracy of data collected by the third photodetector 5-3 in the case that the L-band Raman pump is in the optical time-domain reflection detection mode while there is no C-band signal light in the entire signal optical path, in an embodiment, it would be desirable to turn off the operating state of the first sub-unit 1-1 of the C-band Raman pump and the second sub-unit 1-2 of the C-band Raman pump at a first time. However, turning off of the first sub-unit 1-1 of the C-band Raman pump and the second sub-unit 1-2 of the C-band Raman pump is also affected by the operating state of the L-band Raman pump. In particular, in the case that the L-band Raman pump is in the power amplifier operating mode, the first sub-unit 1-1 of the C-band Raman pump and the second sub-unit 1-2 of the C-band Raman pump still need to be in the power amplifier operating mode no matter whether the signal light intensity detected by the first photodetector 5 is lower than the first preset threshold or not. Therefore, in combination with the embodiment of the present disclosure, there is also an expandable solution where the processor 7 is used to obtain the signal light intensity detection signals from the first photodetector 5-1 and the second photodetector 5-2, and to send a control signal to the first sub-unit 1-1 of the C-band Raman pump and the second sub-unit 1-2 of the C-band Raman pump when it is determined that the signal light intensity in the first photodetector 5-1 is lower than a second preset threshold and the signal light intensity in the second photodetector 5-2 is lower than the first preset threshold, so that the first sub-unit 1-1 of the C-band Raman pump and the second sub-unit 1-2 of the C-band Raman pump enter into a standby mode.

The processor 7 is further used to send a control signal to the first sub-unit 1-1 of the C-band Raman pump and the second sub-unit 1-2 of the C-band Raman pump when it is determined that the signal light intensity in the first photodetector 5-1 is greater than or equal to the second preset threshold and/or the signal light intensity in the second photodetector is greater than the first preset threshold, so that first sub-unit 1-1 of the C-band Raman pump and the second sub-unit 1-2 of the C-band Raman pump enter into the C-band Raman optical fiber amplifier operating mode.

In the embodiment of the present disclosure, in addition to setting the L-band Raman pump to have the optical time-domain reflection detection mode and the L-band Raman optical fiber amplifier operating mode, it is also possible to set the C-band Raman pump (one of the first sub-unit 1-1 of the C-band Raman pump and the second sub-unit 1-2 of the C-band Raman pump may be selected to implement the two operating modes) to have both the above two modes to solve the problems in the prior arts and to achieve the effects of the embodiments of the present disclosure. For details please refer to the content described with reference to FIG. 2 in Embodiment 1, and it would not be repeated herein.

Embodiment 7

In addition to the optical amplifier assembly capable of dynamically performing optical time-domain reflection detection according to Embodiments 1-6, the embodiment of the present disclosure provides a detection method for dynamical optical time-domain reflection detection. The implementation of the embodiment of the present disclosure relies on the optional optical amplifier assemblies capable of dynamically performing optical time-domain reflection detection described in the above embodiments. The detection method proposed in the embodiment of the present disclosure is applicable to the optional optical amplifier assembly according to any one of Embodiments 1-6 and produces effects as described in Embodiments 1-6, for which reference may be made to description of characteristics of the respective assemblies and would not be repeated herein. As shown in FIG. 8, the detection method comprises:

At Step 201, the processor 7 obtains signal light intensity detection signals from the first photodetector 5-1 and the second photodetector 5-2, and sends a control signal to the L-band Raman pump 3 when it is determined that the signal light intensity in the second photodetector 5-2 is lower than a first preset threshold, so that the L-band Raman pump 3 enters into the optical time-domain reflection detection mode;

At Step 202, the processor 7 sends a control signal to the L-band Raman pump 3 when it is determined that the signal light intensity in the second photodetector 5-2 is greater than or equal to the first preset threshold, so that the L-band Raman pump 3 enters into the L-band Raman optical fiber amplifier operating mode.

The embodiment of the present disclosure provides a detection method capable of dynamically performing optical time-domain reflection detection. It is noted that a prior art optical amplifier assembly including both the C-band Raman pump and the L-band Raman pump may be in a condition where the L-band Raman pump does not operate in an L-band Raman optical fiber amplifier operating mode. In the optical amplifier assembly according to the embodiment of the present disclosure, the L-band Raman pump in such a condition may effectively switch to the optical time-domain reflection detection mode. Therefore, the optical time-domain reflection detection may be carried out on the transmission fibers to provide a reference for signal light amplification, without modifying the entire optical path. For example, a fiber connection loss between the Raman amplifier and the transmission fiber, distribution of loss points in the transmission fiber, an attenuation coefficient of the transmission fiber and a dispersion coefficient of the transmission fiber may be measured. For example, when the module is power on, the L-band Raman pump is first used as the OTDR detection light source to measure the line loss, fiber quality and fiber parameters.

In the embodiment of the present disclosure, as the existing L-band Raman pump is expanded to have the two operating modes, in order to further improve accuracy of data collected by the third photodetector 5-3 in the case that the L-band Raman pump is in the optical time-domain reflection detection mode while there is no C-band signal light in the entire signal optical path, in an embodiment, it would be desirable to turn off the operating state of the first sub-unit 1-1 of the C-band Raman pump and the second sub-unit 1-2 of the C-band Raman pump at a first time (the structure described in Embodiments 3-6). However, turning off of the first sub-unit 1-1 of the C-band Raman pump and the second sub-unit 1-2 of the C-band Raman pump is also affected by the operating state of the L-band Raman pump. In particular, in the case that the L-band Raman pump is in the power amplifier operating mode, the first sub-unit 1-1 of the C-band Raman pump and the second sub-unit 1-2 of the C-band Raman pump still need to be in the power amplifier operating mode no matter whether the signal light intensity detected by the first photodetector 5 is lower than the first preset threshold or not. Therefore, in combination with the embodiment of the present disclosure, there is also an expandable solution where:

The processor is further used to obtain signal light intensity detection signals from the first photodetector 5-1 and the second photodetector 5-2, and to send a control signal to the first sub-unit 1-1 of the C-band Raman pump and the second sub-unit 1-2 of the C-band Raman pump when it is determined that the signal light intensity of the first photodetector 5-1 is lower than a second preset threshold and the signal light intensity in the second photodetector is lower than the first preset threshold, so that first sub-unit 1-1 of the C-band Raman pump and the second sub-unit 1-2 of the C-band Raman pump enter into a standby mode;

The processor 7 is further used to send a control signal to the first sub-unit of the C-band Raman pump 1-1 and the second sub-unit 1-2 of the C-band Raman pump when it is determined that the signal light intensity in the first photodetector 5-1 is greater than or equal to the second preset threshold and/or the signal light intensity in the second photodetector is greater than the first preset threshold, so that first sub-unit 1-1 of the C-band Raman pump and the second sub-unit 1-2 of the C-band Raman pump enter into the C-band Raman optical fiber amplifier operating mode.

The second preset threshold may be determined by calculation using the signal light intensity, the split ratio of the signal light splitter and the attenuation index of the first optical wavelength division multiplexer 2-1 in the signal optical path. The second preset threshold is used to determine whether there is a valid C-band signal light transmitting in the current signal optical path. If the signal light intensity in the first photodetector 5-1 is lower than the second preset threshold, it indicates that there is no valid C-band signal light transmitting in the current signal optical path.

In the embodiment of the present disclosure, in addition to setting the L-band Raman pump to have the optical time-domain reflection detection mode and the L-band Raman optical fiber amplifier operating mode, it is also possible to set the C-band Raman pump to have both the above two modes to solve the problems in the prior arts and to achieve the effects of the embodiments of the present disclosure. The C-band Raman pump has two operating modes, namely a C-band Raman optical fiber amplifier operating mode and an optical time-domain reflection detection mode.

At Step 301, the processor 7 obtains signal light intensity detection signals from the first photodetector and the second photodetector, and sends a control signal to the C-band Raman pump when it is determined that the signal light intensity in the first photodetector is lower than the second preset threshold and the signal light intensity in the second photodetector is lower than the first preset threshold, so that the C-band Raman pump enters into the optical time-domain reflection detection mode;

At Step 302, the processor 7 sends a control signal to the C-band Raman pump when it is determined that the signal light intensity in the first photodetector is greater than or equal to the second preset threshold and/or the signal light intensity in the second photodetector is greater than or equal to the first preset threshold, so that the C-band Raman pump enters into the C-band Raman optical fiber amplifier operating mode.

The C-band Raman pump may be a single unit as shown in FIG. 1 or 3 or include two units as shown in FIG. 4-7, or even include more units, without any limitation on its unit number.

Compared to the solution of switching modes of the L-band Raman pump for ODTR detection in some embodiments of the present disclosure, the solution of switching modes of the C-band Raman pump for the ODTR detection is only applicable for off-line implementation. That is to say, the C-band Raman pump may switch to the ODTR detection mode to perform the ODTR detection only when neither the first photodetector 5-1 nor the second photodetector 5-2 detects a valid C-band optical signals or a valid L-band optical signal. On the contrary, mode switching of the L-band Raman pump may be online performed because whether or not the L-band Raman pump is in the power amplification mode is not limited by the C-band optical signal, and it may be performed as long as the signal intensity detected in the second photodetector 5-2 is lower than the first preset threshold. Therefore, switching mode of the L-band Raman pump would be relatively efficient.

Embodiment 8

Figure 9:
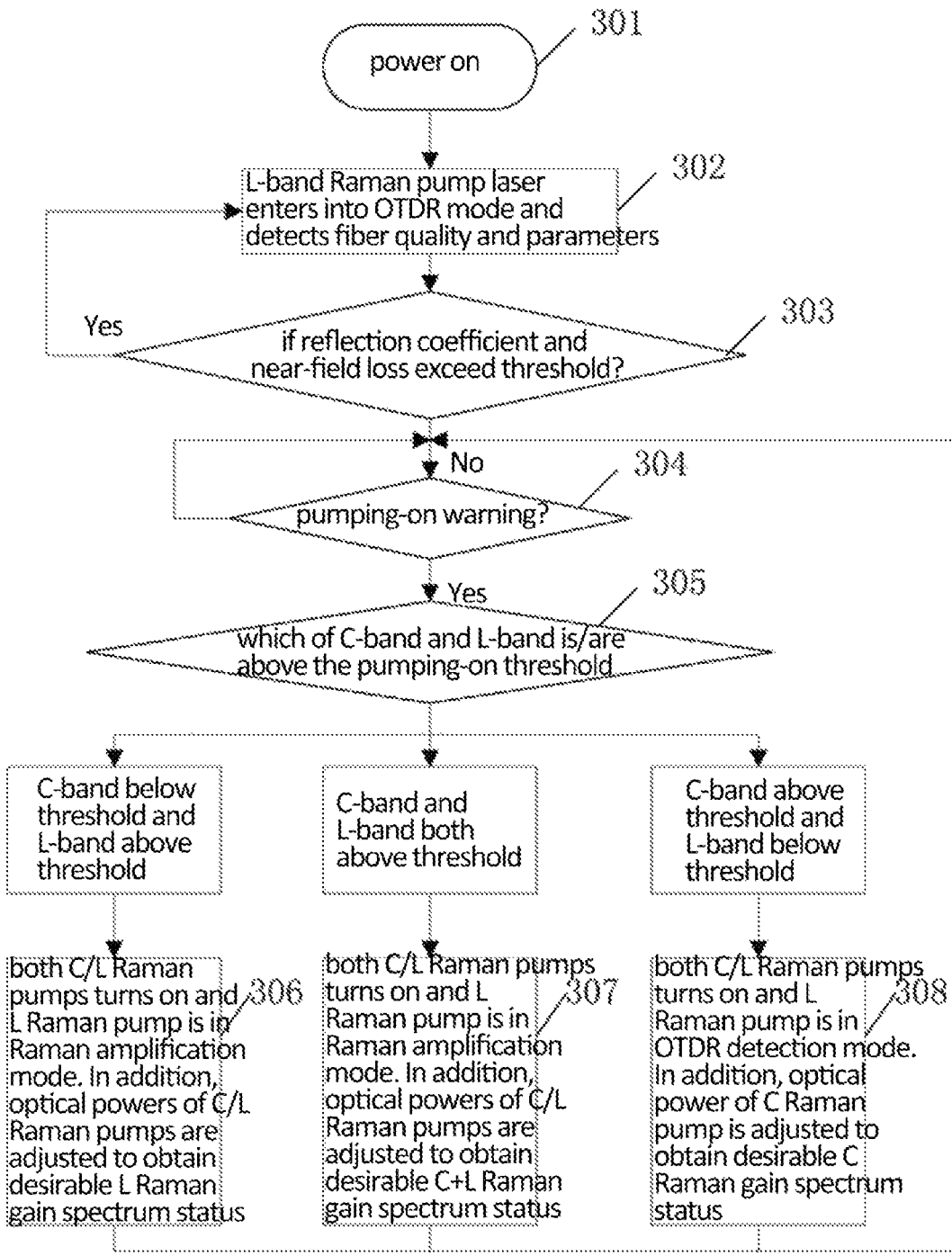
FIG. 9 is a complete flowchart showing operation of an optical amplifier assembly capable of dynamically performing optical time-domain reflection detection in accordance with an embodiment of the present disclosure.

After describing the core steps of the detection method in Embodiment 7, the embodiment of the present disclosure will be further described in conjunction with a more complete operation process. This embodiment is described in the context of switching modes of the L-band Raman pump as described in Embodiment 7. As shown in FIG. 9, the method comprises the following steps:

At Step 301, the optical amplifier assembly is powered on.

At Step 302, the L-band Raman pump laser is first activated and enters into the OTDR detection mode to obtain fiber status, fiber type and fiber parameters of the transmission fiber and detect the reflection coefficient and determine whether the near-field loss exceeds a threshold.

The near-field loss exceeds the threshold if, for example, a total loss within 5 km exceeds 3 dB.

At Step 303, if it is determined that the threshold is exceeded, the method goes back to Step 302; if not, the method proceeds to Step 304. Whether or not the threshold is exceeded is determined by the detection data returned by the third photodetector 5-3. When a ratio of the optical power detected by the third photodetector 5-3 to the L-band Raman pump exceeds the threshold, the L-band Raman pump laser stays in the OTDR detection mode.

At Step 304, it is determined whether there is a warning of not pumping, and if there is no such a warning, then the optical amplifier assembly enters into the amplification mode. The warning of not pumping refers to some situations where pumping is not allowed when some warning exists in the Raman product, for example, a warning of pump temperature or die temperature exceeding a threshold. In addition, there may be other factors that may affect activation of the pump, such as the apparatus housing temperature exceeding a threshold. If the warning always exists, Step 304 is executed cyclically so as to repetitively detect whether the warning has disappeared. If the warning is no longer there, then the process proceeds to Step 305.

At Step 305, it is determined in which of the C-band and the L-band, the signal light has an intensity higher than a pumping-on threshold. Specifically, the determination is done by the processor based on the data transmitted back from the first photodetector 5-1 and the second photodetector 5-2 in FIG. 1 (or FIGS. 3-6). If the C-band is below the pumping-on threshold (i.e., the second preset threshold in Embodiments 1-7) while the L-band is above the pumping-on threshold (i.e., the first preset threshold in Embodiments 1-7), the method proceeds to Step 306; if both exceed respective thresholds, the method proceeds to Step 307; if the C-band signal light exceeds the threshold while the L-band signal light does not, the method proceeds to Step 308.

At Step 306, both the C-band Raman pump and the L-band Raman pump are turned on, and the L-band Raman pump is in the Raman amplification mode. In addition, the optical powers of the C-band and L-band Raman pumps are adjusted so that the L-band Raman gain spectrum reaches a desirable state.

At Step 307, both the C-band Raman pump and the L-band Raman pump are turned on, and the L-band Raman pump is in the Raman amplification mode. In addition, the optical powers of the C-band and L-band Raman pumps are adjusted so that the C+L-band Raman gain spectrum reach a desirable state.

At Step 308, both the C-band Raman pump and the L-band Raman pump are turned on, and the L-band Raman pump is in the OTDR mode. In addition, the optical power of the C-band Raman pump is adjusted so that the C-band Raman gain spectrum reaches a target state.

In the embodiment of the present disclosure, the signal light is divided into C-band and L-band by C/L wavelength division multiplexing for detection respectively. Before being multiplexed in the optical wavelength division multiplexer, the L-band Raman pump light firstly enters the circulator 6 that is used to collect the reflection light in the optical fiber. There are at least six arrangements for the C-band Raman pump laser, the L-band Raman pump laser and the signal light multiplexing, all of which are applicable to methods of Embodiment 7 and this embodiments of the present disclosure. Arrangement 1: the C-band Raman pump light, the L-band Raman pump light and the signal light are multiplexed directly through an optical wavelength division multiplexer, as shown in FIG. 1. Arrangement 2: the C-band Raman pump light and the L-band Raman pump light are multiplexed first, and then multiplexed with the signal light, as shown in FIG. 3. Arrangement 3: the C-band Raman pump lights are multiplexed first (in this case, the C-band Raman pump has multiple sub-bands), and then multiplexed with the L-band Raman pump light; after all Raman pump lights are multiplexed, they are multiplexed/demultiplexed with the signal light, as shown in FIG. 4. Arrangement 4: the L-band Raman pump light is first multiplexed with a portion of the C-band Raman pump light, and then multiplexed with the remaining portion of the C-band Raman pump light, and finally multiplexed/demultiplexed with the signal light, as shown in FIG. 5. Arrangement 5: the C-band Raman pump lights are first multiplexed, and then multiplexed/demultiplexed with the signal light, and finally multiplexed/demultiplexed with the L-band Raman pump light, as shown in FIG. 6. Arrangement 6: the L-band Raman pump light is first multiplexed/demultiplexed with the signal light, and then is multiplexed/demultiplexed with the C-band Raman pump lights that have been internally multiplexed, as shown in FIG. 7. The six multiplexing and demultiplexing arrangements have respective advantages and disadvantages and they each may be implemented in applications, A difference lies in that the attenuation for the Raman pump light of a certain wavelength is different during the multiplexing and demultiplexing process, resulting in a different fiber incident power.

It is noted that communication, interaction and execution thereof between modules and units in the above apparatus and systems are based on the same concept as the method embodiments of the present disclosure. Please refer to the method embodiments for details and it would not be repeated here.

The above description is only the preferred embodiments of the present disclosure and is not intended to limit the present disclosure. Any modification, equivalent replacement, and improvement made within the spirit and principle of the present disclosure shall be included in the protection of the present disclosure.

What is claimed is:

1. An optical amplifier assembly capable of dynamically performing optical time-domain reflection detection, characterized in comprising a first band Raman pump, a second band Raman pump, a circulator, a first optical wavelength division multiplexer, a second optical wavelength division multiplex, a signal light splitter, a first photodetector, a second photodetector, a third photodetector and a processor, wherein:

the signal light splitter is connected in series in a signal optical path, and its optical splitting port is connected to an input port of the first optical wavelength division multiplexer, and two output ports of the first optical wavelength division multiplexer are connected to the first photodetector and the second photo detector, respectively, lights from the first band Raman pump, the second band Raman pump and the signal optical path are multiplexed into a transmission fiber through the second optical wavelength division multiplexer, the circulator is disposed downstream of the first band Raman pump to provide a portion of the light from the first band Raman pump to the third photodetector, data communication ports of the first band Raman pump, the second band Raman pump, the first photodetector, the second photodetector and the third photodetector are connected to the processor, and the first band Raman pump has two operating modes comprising a Raman optical fiber amplifier operating mode and an optical time-domain reflection detection mode.

2. The optical amplifier assembly capable of dynamically performing optical time-domain reflection detection of claim 1, characterized in that the second optical wavelength division multiplexer has three input ports to receive the light from the first band Raman pump, the light from the second band Raman pump and the light from the signal optical path, respectively, and an output port connected to the transmission fiber.

3. The optical amplifier assembly capable of dynamically performing optical time-domain reflection detection of claim 1, characterized in further comprising a third optical wavelength division multiplexer, the light from the first band Raman pump and the light from the second band Raman pump are multiplexed through the third optical wavelength division multiplexer and then provided to the second optical wavelength division multiplexer.

4. The optical amplifier assembly capable of dynamically performing optical time-domain reflection detection of claim 3, characterized in further comprising a fourth optical wavelength division multiplexer, wherein:

the first band is an L band and the second band is a C band, the C-band Raman pump comprises a first C-band Raman pump sub-unit and a second C-band Raman pump sub-unit, the first C-band Raman pump sub-unit and one of the second C-band Raman pump sub-unit and the L-band Raman pump are connected to two input ports of the fourth optical wavelength division multiplexer, respectively, and an output port of the fourth optical wavelength division multiplexer and the other of the second C-band Raman pump sub-unit and the L-band Raman pump are connected to two input ports of the third optical wavelength division multiplexer, respectively.

5. The optical amplifier assembly capable of dynamically performing optical time-domain reflection detection of claim 4, characterized in that the processor operates to obtain signal light intensity detection signals from the first photodetector and the second photodetector, and to send a control signal to the L-band Raman pump when it is determined that the signal light intensity in the first photodetector is lower than a first preset threshold, so that the L-band Raman pump enters into the optical time-domain reflection detection mode;

the processor further operates to send a control signal to the L-band Raman pump when it is determined that the signal light intensity in the first photodetector is greater than or equal to the first preset threshold, so that the L-band Raman pump enters into the Raman optical fiber amplifier operating mode.

6. The optical amplifier assembly capable of dynamically performing optical time-domain reflection detection of claim 5, characterized in that the processor operates to obtain the signal light intensity detection signals from the first photodetector and the second photodetector, and to send a control signal to the first C-band Raman sub-unit and the second C-band Raman pump sub-unit when it is determined that the signal light intensity in the first photodetector is lower than the first preset threshold and the signal light intensity in the second photodetector is lower than a second preset threshold, so that the first C-band Raman pump sub-unit and the second C-band Raman pump sub-unit enter into a standby mode;

the processor further operates to send a control signal to the first C-band Raman pump sub-unit and the second C-band Raman pump sub-unit when it is determined that the signal light intensity in the first photodetector is greater than the first preset threshold and/or the signal light intensity in the second photodetector is greater than or equal to a second preset threshold, so that the first C-band Raman pump sub-unit and the second C-band Raman pump sub-unit enter into the Raman optical fiber amplifier operating mode.

7. The optical amplifier assembly capable of dynamically performing optical time-domain reflection detection of claim 1, characterized in further comprising a third optical wavelength division multiplexer, the light from the first band Raman pump and the light from the signal optical path are multiplexed through the third optical wavelength division multiplexer and then provided to a first input port of the second optical wavelength division multiplexer.

8. The optical amplifier assembly capable of dynamically performing optical time-domain reflection detection of claim 7, characterized in further comprising a fourth optical wavelength division multiplexer, wherein:

the first band is an L band and the second band is a C band, the C-band Raman pump comprises a first C-band Raman pump sub-unit and a second C-band Raman pump sub-unit, the first C-band Raman pump sub-unit and the second C-band Raman pump sub-unit are connected to two input ports of the fourth optical wavelength division multiplexer, respectively, and an output port of the fourth optical wavelength division multiplexer is connected to a second input port of the second optical wavelength division multiplexer.

9. The optical amplifier assembly capable of dynamically performing optical time-domain reflection detection of claim 8, characterized in that the processor operates to obtain signal light intensity detection signals from the first photodetector and the second photodetector, and to send a control signal to the L-band Raman pump when it is determined that the signal light intensity in the first photodetector is lower than a first preset threshold, so that the L-band Raman pump enters into the optical time-domain reflection detection mode;

the processor further operates to send a control signal to the L-band Raman pump when it is determined that the signal light intensity in the first photodetector is greater than or equal to the first preset threshold, so that the L-band Raman pump enters into the Raman optical fiber amplifier operating mode.

10. The optical amplifier assembly capable of dynamically performing optical time-domain reflection detection of claim 9, characterized in that the processor operates to obtain the signal light intensity detection signals from the first photodetector and the second photodetector, and to send a control signal to the first C-band Raman sub-unit and the second C-band Raman pump sub-unit when it is determined that the signal light intensity in the first photodetector is lower than the first preset threshold and the signal light intensity in the second photodetector is lower than a second preset threshold, so that the first C-band Raman pump sub-unit and the second C-band Raman pump sub-unit enter into a standby mode;

the processor further operates to send a control signal to the first C-band Raman pump sub-unit and the second C-band Raman pump sub-unit when it is determined that the signal light intensity in the first photodetector is greater than the first preset threshold and/or the signal light intensity in the second photodetector is greater than or equal to a second preset threshold, so that the first C-band Raman pump sub-unit and the second C-band Raman pump sub-unit enter into the Raman optical fiber amplifier operating mode.

11. The optical amplifier assembly capable of dynamically performing optical time-domain reflection detection of claim 1, characterized in that the first band is one of a C band and an L band, and the second band is the other of the C band and the L band.

12. The optical amplifier assembly capable of dynamically performing optical time-domain reflection detection of claim 11, characterized in that the processor operates to obtain signal light intensity detection signals from the first photodetector and the second photodetector, and to send a control signal to the first-band Raman pump when it is determined that the signal light intensity in the first photodetector is lower than a first preset threshold, so that the first-band Raman pump enters into the optical time-domain reflection detection mode;

the processor further operates to send a control signal to the first-band Raman pump when it is determined that the signal light intensity in the first photodetector is greater than or equal to the first preset threshold, so that the first-band Raman pump enters into the Raman optical fiber amplifier operating mode.

13. The optical amplifier assembly capable of dynamically performing optical time-domain reflection detection of claim 12, characterized in that the first band is the L band and the second band is the C band, the processor operates to obtain the signal light intensity detection signals from the first photodetector and the second photodetector, and to send a control signal to the C-band Raman pump when it is determined that the signal light intensity in the first photodetector is lower than the first preset threshold and the signal light intensity in the second photodetector is lower than a second preset threshold, so that the C-band Raman pump enters into a standby mode, the processor further operates to send a control signal to the C-band Raman pump when it is determined that the signal light intensity in the first photodetector is greater than or equal to the first preset threshold and/or the signal light intensity in the second photodetector is greater than the second preset threshold, so that the C-band Raman pump enters into the Raman optical fiber amplifier operating mode.

14. The optical amplifier assembly capable of dynamically performing optical time-domain reflection detection of claim 1, characterized in further comprising a third optical wavelength division multiplexer and a fourth optical wavelength division multiplexer, the first band is an L band and the second band is a C band, the C-band Raman pump comprises a first C-band Raman pump sub-unit and a second C-band Raman pump sub-unit, the first C-band Raman pump sub-unit and the second C-band Raman pump sub-unit are connected to two input ports of the fourth optical wavelength division multiplexer, respectively, and an output port of the fourth optical wavelength division multiplexer is connected to a first input port of the third optical wavelength division multiplexer, a second input port of the third optical wavelength division multiplexer is connected to the signal optical path, an output port of the third optical wavelength division multiplexer is connected to a first input port of the second optical wavelength division multiplexer, a second input port of the second optical wavelength division multiplexer receives the light from the L-band Raman pump.

15. The optical amplifier assembly capable of dynamically performing optical time-domain reflection detection of claim 14, characterized in that the processor operates to obtain signal light intensity detection signals from the first photodetector and the second photodetector, and to send a control signal to the L-band Raman pump when it is determined that the signal light intensity in the first photodetector is lower than a first preset threshold, so that the L-band Raman pump enters into the optical time-domain reflection detection mode;

the processor further operates to send a control signal to the L-band Raman pump when it is determined that the signal light intensity in the first photodetector is greater than or equal to the first preset threshold, so that the L-band Raman pump enters into the Raman optical fiber amplifier operating mode.

16. The optical amplifier assembly capable of dynamically performing optical time-domain reflection detection of claim 15, characterized in that the processor operates to obtain the signal light intensity detection signals from the first photodetector and the second photodetector, and to send a control signal to the first C-band Raman sub-unit and the second C-band Raman pump sub-unit when it is determined that the signal light intensity in the first photodetector is lower than the first preset threshold and the signal light intensity in the second photodetector is lower than a second preset threshold, so that the first C-band Raman pump sub-unit and the second C-band Raman pump sub-unit enter into a standby mode;

the processor further operates to send a control signal to the first C-band Raman pump sub-unit and the second C-band Raman pump sub-unit when it is determined that the signal light intensity in the first photodetector is greater than the first preset threshold and/or the signal light intensity in the second photodetector is greater than or equal to a second preset threshold, so that the first C-band Raman pump sub-unit and the second C-band Raman pump sub-unit enter into the Raman optical fiber amplifier operating mode.

17. A detection method capable of dynamically performing optical time-domain reflection detection by using an optical amplifier assembly comprising a first band Raman pump, a second band Raman pump, a circulator, a first optical wavelength division multiplexer, a second optical wavelength division multiplex, a signal light splitter, a first photodetector, a second photodetector, a third photodetector and a processor, the signal light splitter being connected in series in a signal optical path, and its optical splitting port being connected to an input port of the first optical wavelength division multiplexer, and two output ports of the first optical wavelength division multiplexer being connected to the first photodetector and the second photo detector, respectively, lights from the first band Raman pump, the second band Raman pump and the signal optical path being multiplexed into a transmission fiber through the second optical wavelength division multiplexer, the circulator being disposed downstream of the first band Raman pump to provide a portion of the light from the first band Raman pump to the third photodetector, data communication ports of the first band Raman pump, the second band Raman pump, the first photodetector, the second photodetector and the third photodetector being connected to the processor, characterized in that the method comprises:

obtaining signal light intensity detection signals from the first photodetector and the second photodetector, and sending a control signal to the first band Raman pump when it is determined that the signal light intensity in the first photodetector is lower than a first preset threshold, so that the first band Raman pump enters into an optical time-domain reflection detection mode;

sending a control signal to the first band Raman pump when it is determined that the signal light intensity in the first photodetector is greater than or equal to the first preset threshold, so that the first band Raman pump enters into a Raman optical fiber amplifier operating mode.

18. The detection method capable of dynamically performing optical time-domain reflection detection of claim 17, characterized in that the first band is one of a C band and an L band, and the second band is the other of the C band and the L band.

19. The detection method capable of dynamically performing optical time-domain reflection detection of claim 18, characterized in that the first band is an L band and the second band is a C band, the detection method further comprises:

obtaining signal light intensity detection signals from the first photodetector and the second photodetector, and sending a control signal to the C-band Raman pump when it is determined that the signal light intensity in the first photodetector is lower than the first preset threshold and the signal light intensity in the second photodetector is lower than a second preset threshold, so that the C-band Raman pump enters into a standby mode;

sending a control signal to the C-band Raman pump when it is determined that the signal light intensity in the first photodetector is greater than the first preset threshold and/or the signal light intensity in the second photodetector is greater than or equal to the second preset threshold, so that the C-band Raman pump enters into a C-band Raman optical fiber amplifier operating mode.

20. The detection method capable of dynamically performing optical time-domain reflection detection of claim 19, characterized in that the C-band Raman pump comprises a first C-band Raman pump sub-unit and a second C-band Raman pump unit.

* * * * *